(12) United States Patent
Cagle et al.

(10) Patent No.: US 9,416,837 B2
(45) Date of Patent: Aug. 16, 2016

(54) COMPRESSION SPRING ASSEMBLY AND METHOD

(71) Applicant: Firestone Industrial Products Company, LLC, Indianapolis, IN (US)

(72) Inventors: Jakob B Cagle, Indianapolis, IN (US); Albert Steven Phillips, Noblesville, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 0 days.

(21) Appl. No.: 14/491,346

(22) Filed: Sep. 19, 2014

(65) Prior Publication Data

US 2015/0001774 A1    Jan. 1, 2015

Related U.S. Application Data

(63) Continuation of application No. 13/001,356, filed as application No. PCT/US2009/065326 on Nov. 20, 2009, now Pat. No. 8,864,119.

(51) Int. Cl.
| | |
|---|---|
| *B60G 11/22* | (2006.01) |
| *F16F 3/087* | (2006.01) |
| *A47C 23/04* | (2006.01) |
| *F16F 1/38* | (2006.01) |

(52) U.S. Cl.
CPC ............... *F16F 3/0873* (2013.01); *A47C 23/04* (2013.01); *F16F 1/3863* (2013.01); *F16F 2230/40* (2013.01); *Y10T 29/49609* (2015.01)

(58) Field of Classification Search
CPC ... F16F 3/0873; F16F 1/3863; F16F 2230/40; A47C 23/04; Y10T 29/49609
USPC ................. 267/292, 293, 141, 141.2
See application file for complete search history.

(56) References Cited

U.S. PATENT DOCUMENTS

| | | |
|---|---|---|
| 2,069,270 A | 2/1937 | Piron |
| 3,305,227 A | 2/1967 | Henley |
| 3,892,398 A * | 7/1975 | Marsh ........................... 267/153 |

(Continued)

FOREIGN PATENT DOCUMENTS

| | | |
|---|---|---|
| DE | 31 39 680 C2 | 9/1983 |
| JP | 2007-278438 | 10/2007 |

(Continued)

OTHER PUBLICATIONS

Marshmellow Springs Vibration Isolation Design Manual (MMDM 108), pp. 1-60, Firestone Industrial Products Company, 2008.

(Continued)

*Primary Examiner* — Robert A Siconolfi
*Assistant Examiner* — Charles Poon
(74) *Attorney, Agent, or Firm* — Thomas R. Kingsbury; Fay Sharpe LLP

(57) ABSTRACT

A compression spring assembly can include a compression spring core and a compression spring shell that can be assembled onto the compression spring core. The compression spring core can include a core body with an outer core wall. The compression spring shell can include a shell body having an inner shell wall. The compression spring shell can be supported on the compression spring core such that the inner shell wall extends along at least a portion of the outer core wall. A method of manufacturing a compression spring assembly is also included.

20 Claims, 20 Drawing Sheets

(56) References Cited

U.S. PATENT DOCUMENTS

| | | | |
|---|---|---|---|
| 4,493,631 A | | 1/1985 | Dieckmann et al. |
| 4,541,978 A | | 9/1985 | Dieckmann et al. |
| 4,750,720 A | | 6/1988 | Wolf et al. |
| 5,014,967 A | * | 5/1991 | Wolf et al. .................... 267/153 |
| 5,123,625 A | * | 6/1992 | Spaltofski .................... 248/634 |
| 5,299,790 A | | 4/1994 | Whightsil, Sr. |
| 5,641,248 A | | 6/1997 | Arlt, III |
| 6,202,994 B1 | * | 3/2001 | Spurlin ......................... 267/136 |
| 6,224,047 B1 | * | 5/2001 | Gwinn ........................... 267/292 |
| 7,370,852 B2 | * | 5/2008 | Nicholson et al. ....... 267/140.12 |
| 7,954,793 B2 | * | 6/2011 | Weisbeck et al. ............. 267/292 |
| 2004/0113337 A1 | * | 6/2004 | Landry, Jr. .................... 267/141 |
| 2007/0063401 A1 | * | 3/2007 | Rodecker ...................... 267/292 |
| 2007/0262504 A1 | * | 11/2007 | Varrone et al. ................ 267/154 |
| 2008/0136071 A1 | * | 6/2008 | Weisbeck et al. ............. 267/136 |
| 2009/0295051 A1 | * | 12/2009 | Kim .............................. 267/293 |
| 2012/0313307 A1 | * | 12/2012 | Cartwright et al. ........... 267/141 |

FOREIGN PATENT DOCUMENTS

| | | |
|---|---|---|
| KR | 10-2008-0025248 | 3/2008 |
| KR | 10-2008-0051308 | 6/2008 |

OTHER PUBLICATIONS

International Search Report and Written Opinion.

* cited by examiner

COMPRESSION SPRING ASSEMBLY AND METHOD

This application is a continuation of U.S. patent application Ser. No. 13/001,356, filed on Apr. 18, 2011, which was the National Stage of International Application No. PCT/US2009/065326, filed on Nov. 20, 2009, the subject matter of each of which is hereby incorporated herein by reference in its entirety.

BACKGROUND

The subject matter of the present disclosure broadly relates to the art of spring devices and, more particularly, to a compression spring assembly that includes a compression spring core and a compression spring shell that is provided separately from the compression spring core, as well as a method of manufacturing the same.

Compression springs, such as those disclosed in U.S. Pat. No. 3,892,398, for example, are relatively well known and enjoy usage in a variety of applications and environments. Notwithstanding the overall success of such known compression springs, however, certain issues exist that may be providing resistance to even greater adoption and use of such known compression springs.

One example of such an issue may relate to the relationship between the quantity or mass of uncured material in a given compression spring design and the length of time associated with curing that quantity or mass of material to form the finished product. That is, the use of a greater wall thickness of a compression spring construction will generally take a greater length of time to cure into a finished compression spring than a compression spring design having a comparatively thinner wall thickness. Such increased lengths of time may, in some cases, undesirably result in reductions in overall production rates and/or increased manufacturing costs.

Another example of such an issue may relate to the performance characteristics of associated with known compression spring constructions. That is, the reinforcing layers that are formed as a part of the monolithic structure of conventional compression springs are generally uniform along the longitudinal length of the compression spring. As a result, the contribution of these reinforcing layers to the performance characteristics of a conventional compression spring will be generally consistent along the longitudinal length thereof. Thus, conventional compression spring designs are poorly suited for the development of constructions that permit variations in the performance characteristics of the compression spring over the longitudinal length thereof.

Accordingly, it is believed desirable to advance the art of compression spring devices and develop compression spring constructions that may be useful in overcoming the foregoing and/or other issues that may exist with known compression springs.

BRIEF DESCRIPTION

One example of a compression spring assembly in accordance with the subject matter of the present disclosure can include a compression spring core and a compression spring shell. The compression spring core can include a core body that is formed from one of cured rubber material and thermoplastic elastomer material. The core body can extend longitudinally between opposing first and second core ends and can have a longitudinal axis. The core body can include a first core end wall, a second core end wall disposed in longitudinally-spaced relation to the first core end wall, an inner core wall and an outer core wall. The inner core wall can at least partially define a core inner passage that can extend at least approximately longitudinally through the core body. The compression spring shell can include a first shell body that can include at least one layer formed from one of cured rubber material and thermoplastic elastomer material. The first shell body can extend longitudinally between opposing first shell ends. The first shell body can include a first shell end wall, a second shell end wall disposed in longitudinally-spaced relation to the first shell end wall, a first inner shell wall and a first outer shell wall. The first inner shell wall can at least partially define a first shell inner passage that can extend at least approximately longitudinally through the first shell body. A second shell body can include at least one layer formed from one of cured rubber material and thermoplastic elastomer material. The second shell body can extend longitudinally between opposing second shell ends. The second shell body can include a third shell end wall, a fourth shell end wall disposed in longitudinally-spaced relation to the third shell end wall, a second inner shell wall and a second outer shell wall. The second inner shell wall can at least partially define a second shell inner passage that can extend at least approximately longitudinally through the second shell body. The first and second shell bodies of the compression spring shell can be supported on the compression spring core such that the first inner shell wall of the first shell body and the second inner shell wall of the second shell body extend along and are in abutting engagement with at least a portion of the outer core wall.

Another example of a compression spring assembly in accordance with the subject matter of the present disclosure can include a compression spring core and a compression spring shell. The compression spring core can include a core body that extends longitudinally between opposing first and second core ends and can have a longitudinal axis. The core body can include a first core end wall, a second core end wall that is disposed in longitudinally-spaced relation to the first core end wall, an inner core wall and an outer core wall. The inner core wall can at least partially define a core inner passage extending at least approximately longitudinally through the core body. The compression spring shell can include a shell body that can extend longitudinally between opposing first and second shell ends. The shell body can include a first shell end wall, a second shell end wall disposed in longitudinally-spaced relation to the first shell end wall, an inner shell wall and an outer shell wall. The inner shell wall can at least partially define a shell inner passage that extends at least approximately longitudinally through the shell body. The compression spring shell can be supported on the compression spring core such that the inner shell wall extends along and is in abutting engagement with at least a portion of the outer core wall.

One example of a method of manufacturing a compression spring assembly in accordance with the subject matter of the preset disclosure can include providing a compression spring core that includes a core body formed from one of cured rubber material and thermoplastic elastomer material. The core body can extend longitudinally between opposing first and second core ends and can have a longitudinal axis. The core body can include a first core end wall, a second core end wall that can be disposed in longitudinally-spaced relation to the first core end wall, an inner core wall and an outer core wall. The inner core wall can at least partially define a core inner passage that can extend at least approximately longitudinally through the core body. The method can also include providing a compression spring shell that can include a first shell body that has at least one layer formed from one of cured rubber material and thermoplastic elastomer material. The first shell body can extend longitudinally between opposing first shell ends. The first shell body can include a first shell end wall, a second shell end wall disposed in longitudinally-spaced relation to the first shell end wall, a first inner shell wall and a first outer shell wall. The first inner shell wall can at least partially define a first shell inner passage that can extend at least approximately longitudinally through the first shell body. The method can further include assembling the compression spring shell onto the compression spring core by positioning the first shell body along the core body such that the first inner shell wall extends along and is in abutting engagement with at least a portion of the outer core wall of the core body.

DETAILED DESCRIPTION

Figure 1:
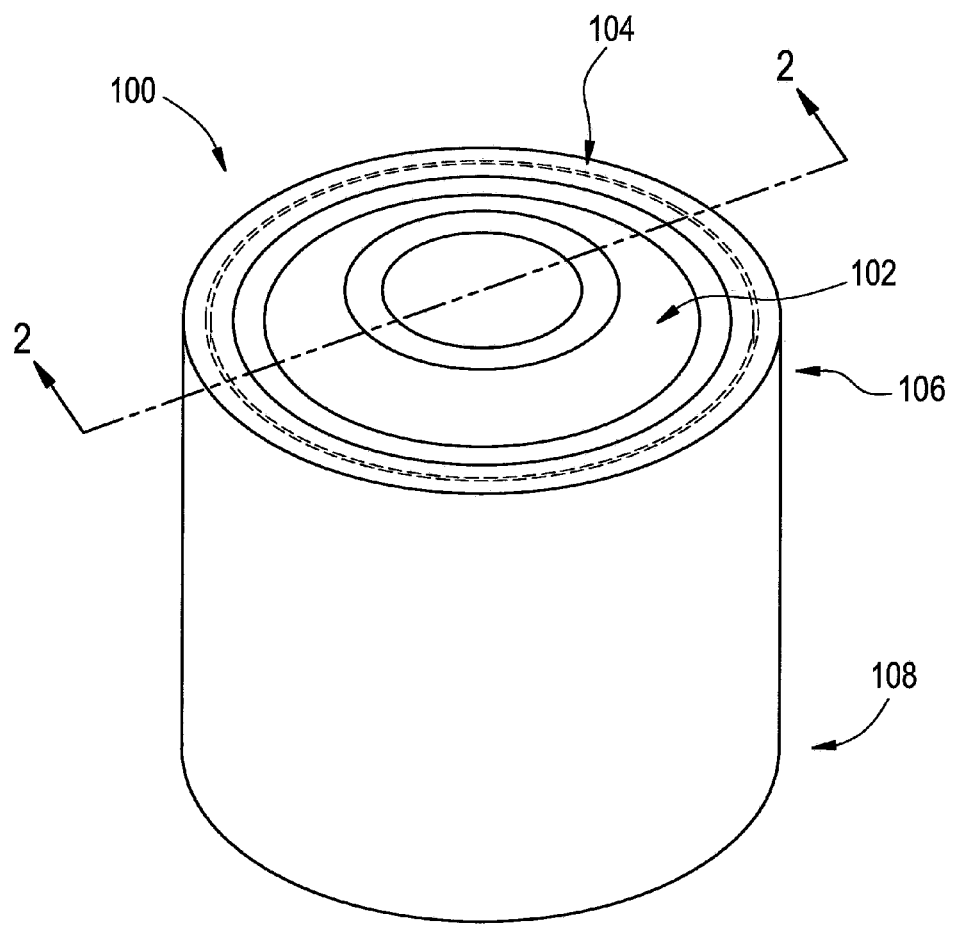
FIG. 1 is a top perspective view of one example of an elastomeric compression spring assembly in accordance with the subject matter of the present disclosure.

Turning, now, in greater detail to the subject matter of the present disclosure, a compression spring assembly is disclosed that includes a compression spring core as well as a compression spring shell, which is provided separately from the compression spring core. The compression spring shell is installed along or otherwise assembled together with the compression spring core to form a compression spring assembly. In general, the compression spring core will tend to flow or deflect in at least a radially outward direction under axially-compressive load conditions. The compression spring shell is operative to restrict such radially-outward expansion of the compression spring core and thereby assist in controlling the overall axial deflection and spring rate of the compression spring assembly.

A compression spring assembly in accordance with the subject matter of the present disclosure can be of any suitable size and/or shape, and can take any suitable form, arrangement, configuration and/or construction. For example, the compression spring core can include any number of one or more core bodies and the compression spring shell can include any number of one or more shell bodies. In some cases, a single core body may be used. In cases in which two or more shell bodies are included, the two or more bodies can collectively act as or otherwise operate to form the compression spring shell.

Additionally, it will be appreciated that the size and/or shape as well as the configuration and/or arrangement of the compression spring assembly will generally have a relation to the sizes, shapes, configurations and/or arrangements of the compression spring core and the compression spring shell. It will be further appreciated, then, that the one or more core bodies and the one or more shell bodies, while being generally complimentary to one another for assembly and operational purposes, can be of any suitable size and/or shape and can take any suitable form, arrangement, configuration and/or construction and that the embodiments shown and described herein are merely exemplary and not intended to be in any way limiting.

With reference, now, to the drawings and with the understanding that the same are for illustrative purposes and not intended to be in any way limiting, FIGS. 1-4 illustrate one example of a compression spring assembly 100 that includes a compression spring core 102 and a compression spring shell 104, which is provided separately from the compression spring core. Compression spring assembly 100 has a longitudinally-extending axis AX and extends longitudinally between opposing first and second ends 106 and 108.

Compression spring core 102 includes a core body 110 and can optionally include any one or more other components and/or elements, such as, for example, mounting components and/or load transfer components. Examples of mounting components can include fasteners (not shown), washers (not shown) and inner support members (not shown), such as could be used in mounting or otherwise securing a compression spring assembly on or along an associate structural component (e.g., a sprung or unsprung mass of a vehicle). An example of a load transfer component can include one or more end plates (not shown), such as could be operatively disposed between an end of a compression spring assembly and an associated structural component (e.g., a sprung or unsprung mass of a vehicle).

The core body can include opposing end walls that each define at least one end wall portion or surface and can also include at least one outer wall that at least partially defines an outer wall portion or surface. In the exemplary arrangement shown in FIGS. 1-4, core body 110 extends between a first or upper end 112 and a second or lower end 114. Core body 110 is shown as including a first or upper end wall 116 disposed along first end 112 and a second or lower wall 118 disposed along second end 114.

First end wall 116 is shown as including a first wall portion or surface 120, a second wall portion or surface 122 that is spaced radially-outwardly from the first wall portion, and a third wall portion or surface 124 that extends generally therebetween. Similarly, second end wall 118 is shown as including a first wall portion or surface 126, a second wall portion or surface 128 that is spaced radially-outwardly from the first wall portion, and a third wall portion or surface 130 that extends generally therebetween. In the arrangement shown in FIGS. 1-4, first and second surfaces 120 and 122 are approximately planar and disposed in axially-spaced relation to one another such that third surface 124 is approximately frustoconical. Similarly, first and second surfaces 126 and 128 are approximately planar and are disposed in axially-spaced relation to one another such that third surface 130 is approximately frustoconical. It will be recognized that first and second end walls 116 and 118 are shown and described as being substantially similar to one another. It is to be understood, however, that the first and second end walls can take any suitable form, arrangement and/or configuration, whether substantially the same or different, without limitation, and that the arrangements shown and described herein are merely exemplary.

Core body 110 is also shown as including an inner core wall 132 and an outer core wall 134. The inner core wall at least partially defines a core inner passage 136 that extends at least partially into the core body. In the exemplary arrangement shown, core inner passage 136 extends longitudinally through the core body. Outer core wall 134 can at least partially define an outer surface (not numbered) of the core body that can operatively interface with one or more corresponding surfaces of the compression spring shell or components thereof. Inner core wall 132 can be of any suitable size and/or shape and, in the present exemplary embodiment, is shown as having an at least approximately circular cross-sectional shape, which results in passage 136 having an at least approximately cylindrical shape. It will be appreciated, however, that any other shape or configuration could alternately be used, such as a non-circular cross-sectional shape (e.g., oval, polygonal, irregular) or a non-cylindrical passage (e.g., frustoconical). Additionally, the outer core wall can be of any suitable size, shape, arrangement and/or configuration. In the present exemplary embodiment, outer core wall 134 is shown as having an at least approximately circular cross-sectional shape, which results in the core body having an at least approximately cylindrical outer peripheral shape. Again, it will be appreciated, however, that any other shape or configuration could alternately be used, such as a non-circular cross-sectional shape (e.g., oval, polygonal, irregular) or a non-cylindrical outer peripheral shape (e.g., frustoconical).

Figure 3:
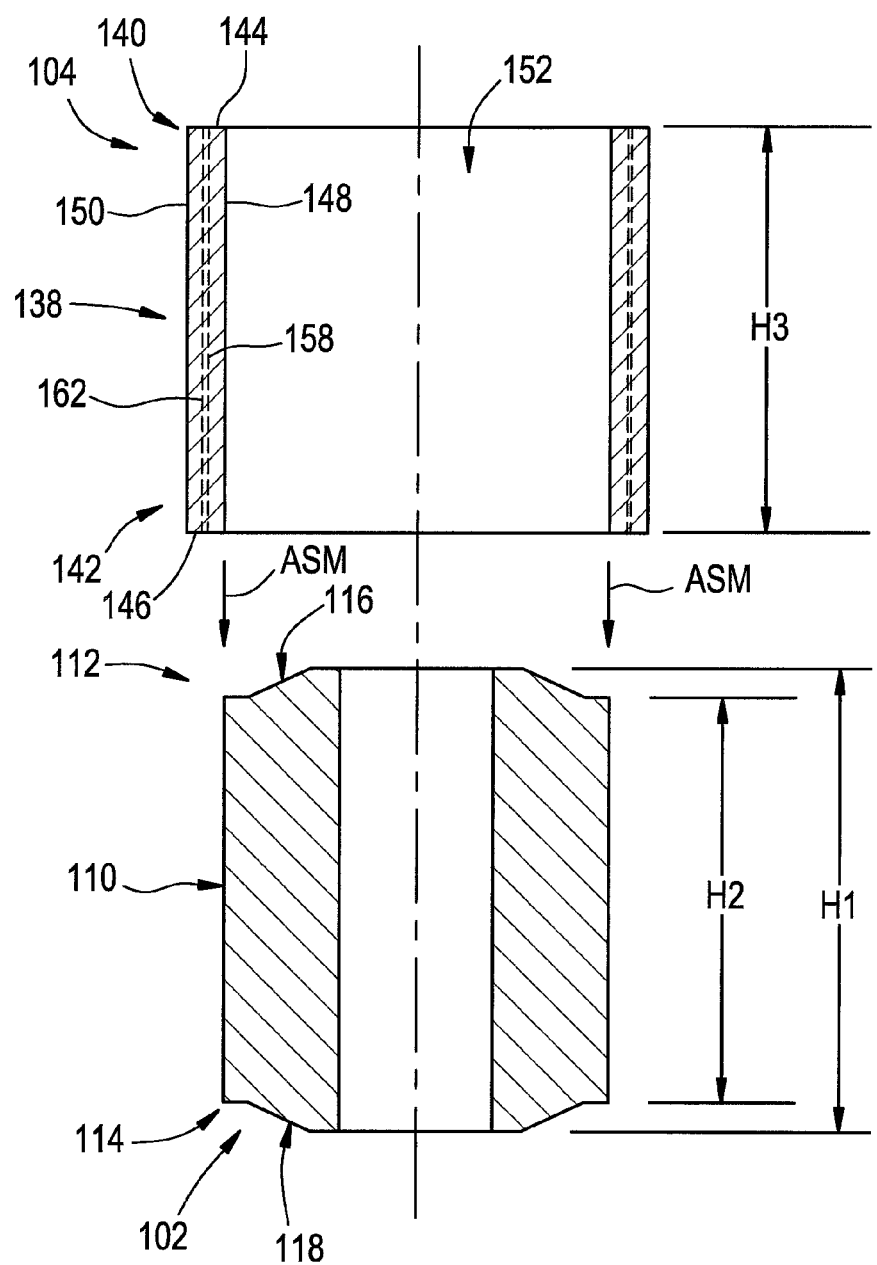
FIG. 3 is an exploded cross-sectional side view of the elastomeric compression spring assembly shown in FIGS. 1 and 2 prior to assembly.

Additionally, core body 110 has a first or overall height, which is represented by reference dimension H1 in FIG. 3, that is generally defined between the opposing first and second end walls (e.g., first end wall 116 and second end wall 118) of the core body. Due to the offset or axial spaced relation of the second surfaces (e.g., second surfaces 122 and 128) to the respective first surfaces (e.g., first surfaces 120 and 128) of the first and second end walls, outer core wall 134 is has a second height, which is represented by reference dimension H2 in FIG. 3, that is less than overall height H1 of the core body.

Furthermore, compression spring core 102 can be formed from any suitable material or combination of materials capable of providing the desired performance characteristics of the above-described compression spring assemblies. Examples of suitable materials can include rubber, such as natural and/or synthetic rubber, for example, and thermoplastic elastomers, such as polyurethane, for example. In one exemplary arrangement, at least core body 110 can be formed from one or more masses (e.g., a single monolithic mass, or one or more layers or body segments) of uncured rubber. The one or more masses of uncured rubber can then be vulcanized or otherwise cured to form a single, unitary core body. It will be appreciated, however, that the foregoing construction is merely exemplary and that any other suitable process or combination of operations for manufacturing such a construction could alternately be used.

As indicated above, a compression spring shell can be of any suitable size and/or shape and can take any suitable form, arrangement, configuration and/or construction. In a preferred arrangement, the compression spring shell will be complimentary to the compression spring core such that the compressive spring shell can operate to restrict at least radially-outward expansion of the compression spring core, as discussed above. The compression spring shell can include any number of one or more shell bodies. The at least one shell body can extend longitudinally between opposing ends and include opposing end walls. the at least one shell body can also include at least one inner wall that at least partially defines a shell inner passage and at least one outer wall that at least partially defines an outer peripheral extent of the at least one shell body.

In the exemplary arrangement shown in FIGS. 1-4, compression spring shell 104 includes a single shell body 138 that extends longitudinally between a first or upper end 140 and a second or lower end 142. Shell body 138 includes a first or upper shell end wall 144 disposed along first end 140 and a second or lower shell end wall 146 disposed along second end 142. As such, shell body 138 has a first or overall height, which is represented in by reference dimension H3 in FIG. 3, that is generally defined between the first and second shell end walls. Accordingly, shell body 138 and outer core wall 134 are of approximately the same longitudinal length, such that heights H2 and H3 are approximately equal to one another. Shell body 138 also includes an inner shell wall 148 and an opposing outer shell wall 150. Inner shell wall 148 at least partially defines a shell inner passage 152 that extends through the shell body.

Figure 4:
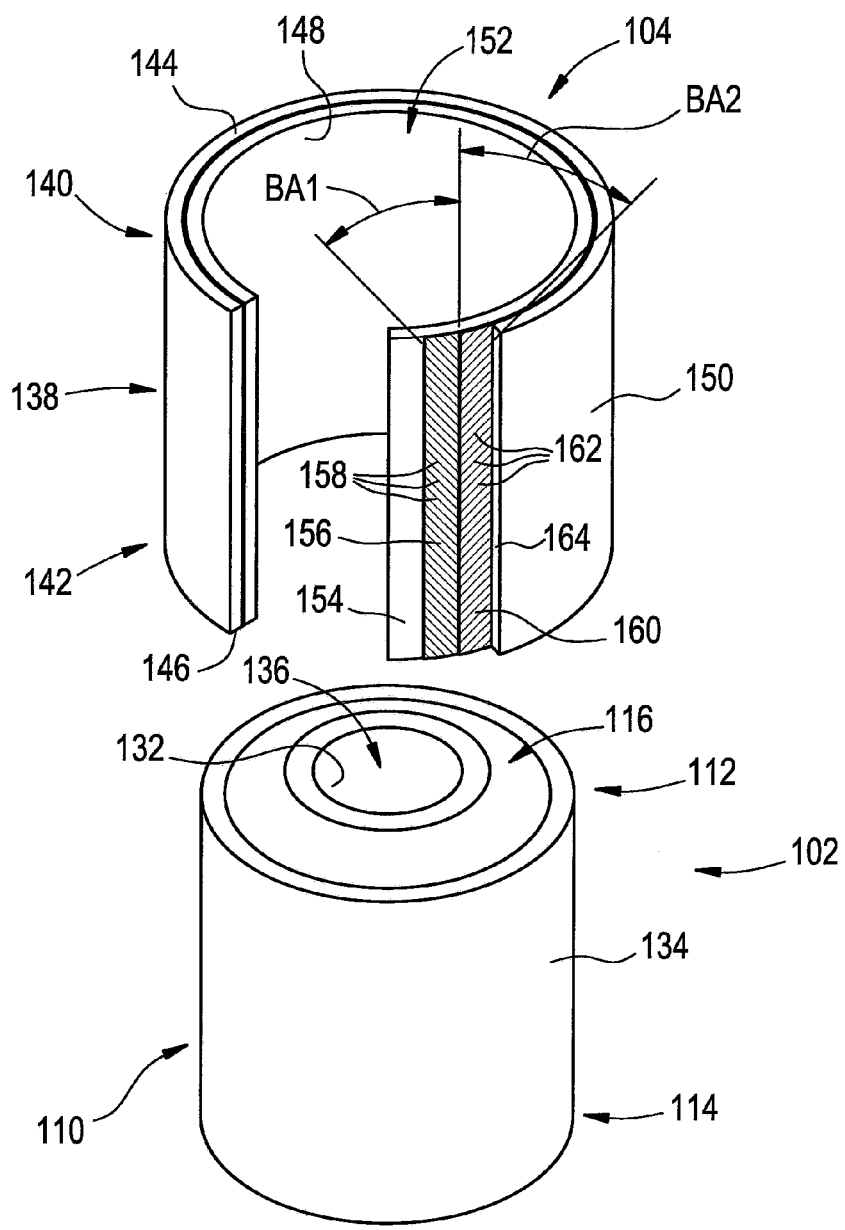
FIG. 4 is an exploded, top perspective view, in partial cross-section, of the elastomeric compression spring assembly in FIGS. 1-3 prior to assembly.

Shell body 138 can be formed from any number of one or more layers or plies of material that provide the desired performance characteristics for the compression spring shell to restrict or otherwise restrain at least the radially-outward expansion of the compression spring core, as has been described above. As one example, shell body 138 can be formed from a plurality of layers of different materials. As shown in FIG. 4, such shell body 138 can include a first or inner layer or ply 154 that at least partially defines inner shell wall 148. A first reinforcing layer or ply 156 can be disposed radially-outwardly of the first inner layer and can include a first plurality of reinforcing cords 158 that are at least partially embedded therein. A second reinforcing layer or ply 160 can be disposed radially-outwardly of the first reinforcing ply and include a second plurality of reinforcing cords 162 that are at least partially embedded therein. A second or outer layer or ply 164 can be disposed radially-outwardly of the second reinforcing ply and can at least partially define outer shell wall 150.

In a preferred arrangement, layers 154, 156, 160 and 164 can be formed from a common elastomeric material, such as rubber, for example. In such case, the layers can be provided separately in an uncured state or condition and built-up or otherwise constructed together in this uncured condition. The assembled layers can then subsequently vulcanized or otherwise cured to form shell body 138. It will be appreciated, however, that the foregoing construction is merely exemplary and that any other suitable process or combination of operations for manufacturing such a construction could alternately be used.

It will be appreciated that reinforcing cords 158 and 162, if provided, can be of any suitable type, kind and/or construction and can be formed from any suitable material or combination of materials. For example, reinforcing cords 158 and/or 162 could take the form of monofilaments or twisted strands of fibers. Additionally, reinforcing cords 158 and/or 162 could, for example, be formed from natural fibers (e.g., cotton yarn) or polymeric filaments (e.g., nylon or aramid cords).

If provided, the reinforcing cords of first and second reinforcing plies 156 and 160 can be disposed in any suitable arrangement and/or configuration. For example, the reinforcing cords could be disposed at a non-zero bias angle with respect to longitudinal axis AX such that the reinforcing cords extend both longitudinally and circumferentially along the reinforcing plies. As shown in FIG. 4, first reinforcing plies 156 can be disposed at a first bias angle, which is identified by reference dimension BA1 in FIG. 4, and second reinforcing plies 160 can be disposed at a second bias angle, which is identified by reference dimension BA2 in FIG. 4. It will be appreciated that any suitable bias angle of can be used for the reinforcing cords of the first and second, such as a bias angle within a range of from approximately 3 degrees to approximately 87 degrees, for example. Additionally, it will be appreciated that the reinforcing cords of the first reinforcing ply can be disposed at the same or a different bias angle. In one exemplary arrangement, such as is shown in FIG. 4, first and second bias angles BA1 and BA2 are at least approximately equal to one another but are oriented in opposing directions.

Figure 2:
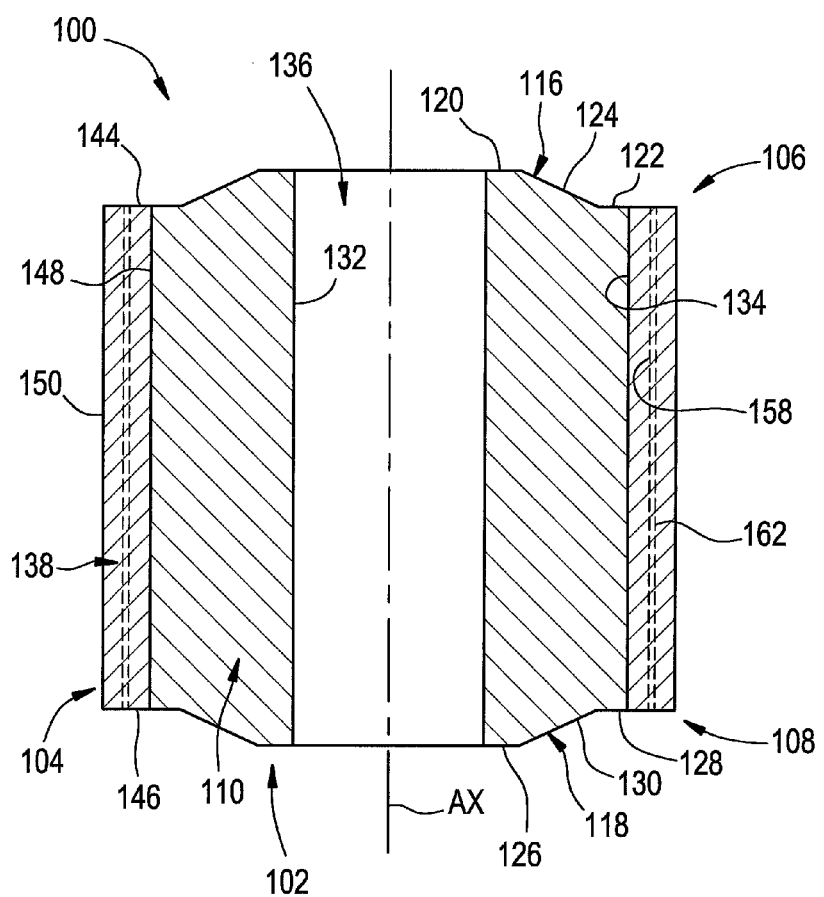
FIG. 2 is a cross-sectional side view of the elastomeric compression spring assembly shown in FIG. 1 taken from along line 2-2 thereof.

Compression spring shell 104 can be installed along or otherwise assembled together with compression spring core 102 in any manner suitable for forming compression spring assembly 100. That is, compression spring core 102 and compression spring shell 104 can be longitudinally displaced relative to one another in any suitable manner such that the at least two components of the compression spring assembly (e.g., core 102 and shell 104), which are provided separately from one another, are assembled together, such as is represented in FIG. 3 by arrows ASM. It will be appreciated that such an action can be performed in any suitable manner, such as, for example, by inverting the compression spring shell and rolling the same onto compression spring core. As another example, the compression spring shell could be radially-outwardly expanded and/or the compression spring core could be elongated to reduce the diameter of the outer core wall thereof. In this manner, the interengagement between the compression spring shell and the compression spring core could be reduced thereby permitting the at least two components to be longitudinally displaced relative to one another into an assembled condition, such as is shown in FIGS. 1 and 2, for example.

Regardless of the method by which compression spring core 102 and compression spring shell 104 are assembled with one another, compression spring assembly 100 will include outer core wall 134 abuttingly engaging inner shell wall 148. In the exemplary arrangement shown in FIGS. 1-4, shell body 138 is positioned along core body 110 such that shell end walls 144 and 146 are respectively disposed in approximate alignment with second wall portions 122 and 128 of first and second end walls 116 and 118. It will be appreciated, however, that any other suitable arrangement could alternately be used.

Compression spring shell 104 can be retained in position on or along compression spring core 102 in any suitable manner. In many cases, the frictional interengagement between abutting inner shell wall 148 and outer core wall 134 may be sufficient to retain the compression spring shell in position on or along the compression spring core. Additionally, or in the alternative, a retaining element may be used to attach the otherwise separate components of the compression spring assembly to one another. For example, an adhesive substance (not shown) could be disposed between abutting surfaces of the compression spring shell and the compression spring core. As another example, a non-elastic retaining element, such as a metal retaining ring, for example, could be crimped or otherwise secured along the compression spring shell to affix the same in position on the compression spring core. It will be appreciated, however, that any other suitable arrangement could alternately be used.

Figure 5:
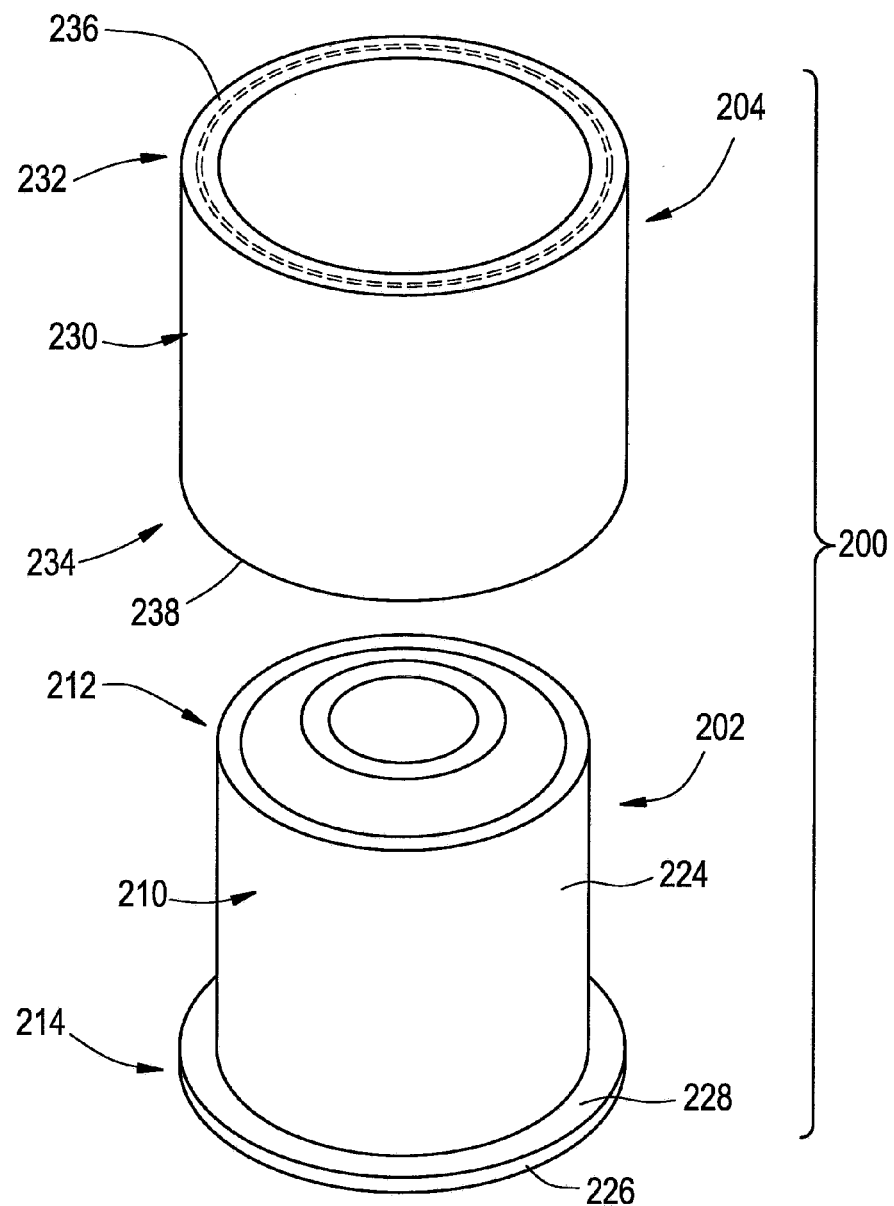
FIG. 5 is an exploded, top perspective view of another example of an elastomeric compression spring assembly in accordance with the subject matter of the present disclosure.
Figure 6:
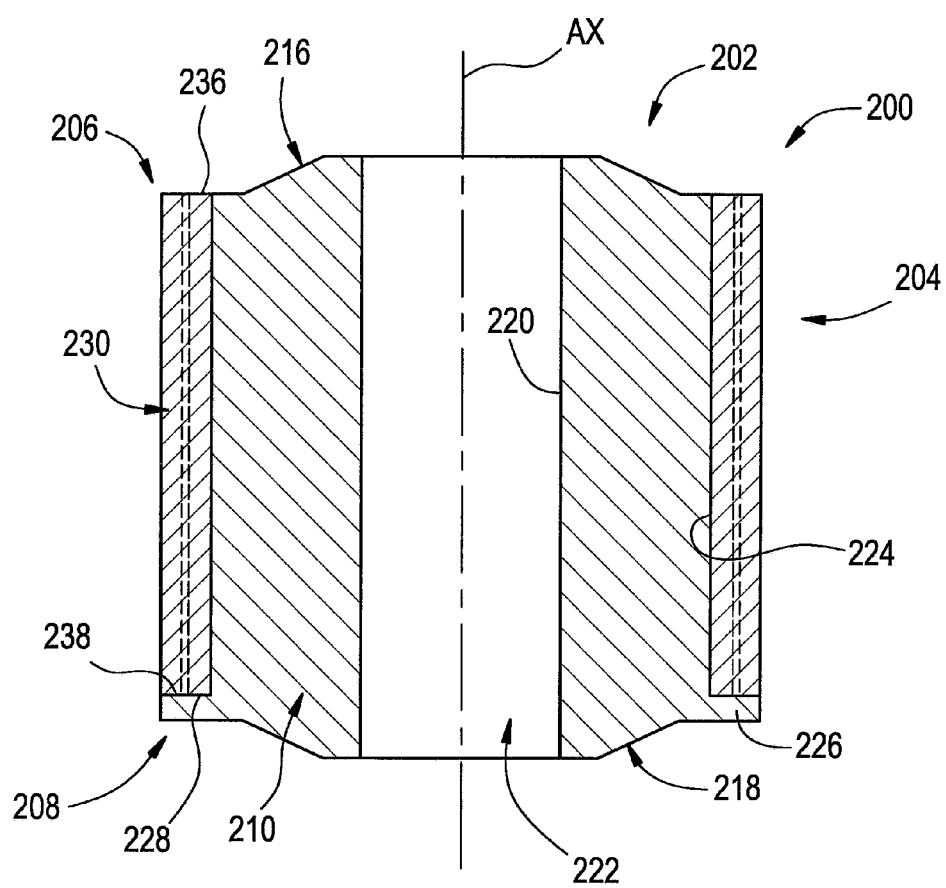
FIG. 6 is a cross-sectional side view of the elastomeric compression spring assembly shown in FIG. 5.
Figure 7:
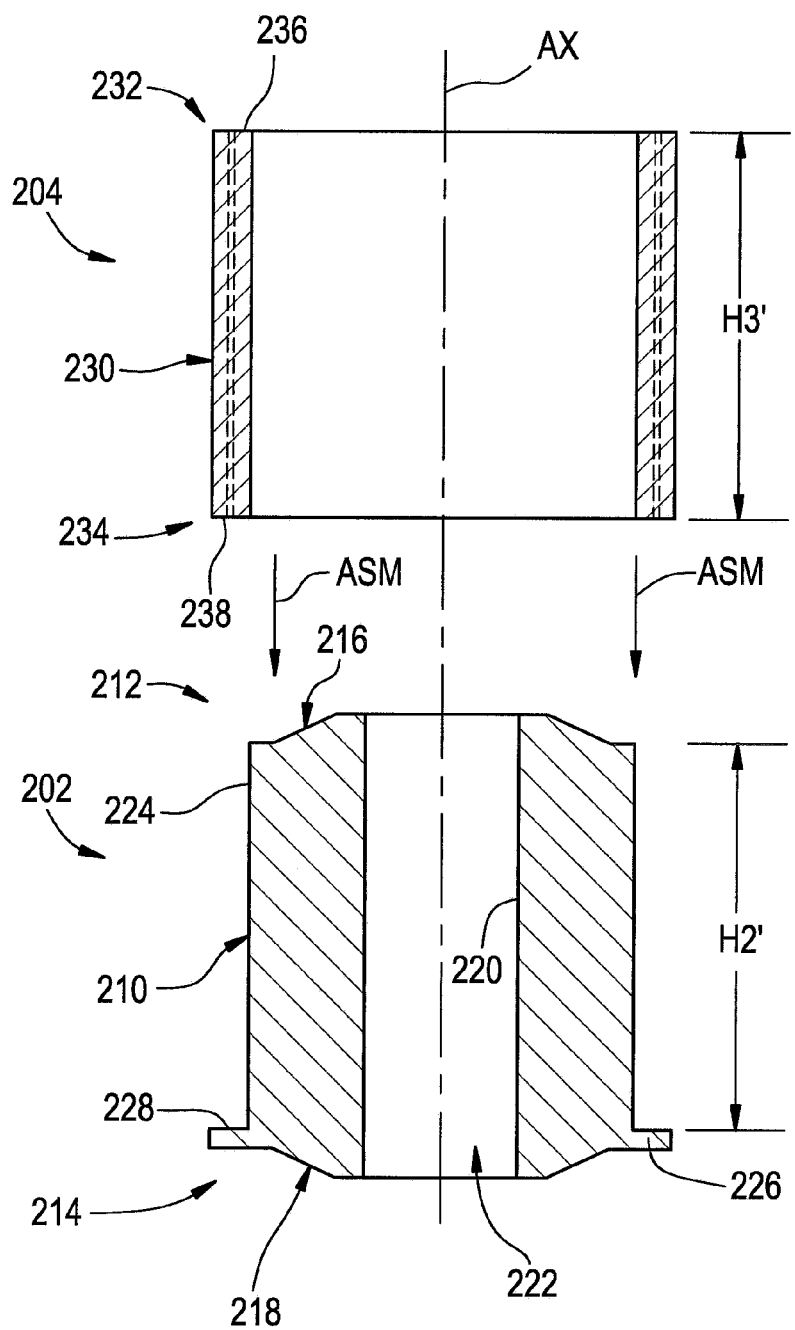
FIG. 7 is an exploded cross-sectional side view of the elastomeric compression spring assembly shown in FIGS. 5 and 6 prior to assembly.

Another example of a compression spring assembly 200 in accordance with the subject matter of the present disclosure is illustrated in FIGS. 5-7. Compression spring assembly 200 includes a compression spring core 202 and a compression spring shell 204, which is provided separately from the compression spring core. Compression spring assembly 200 has a longitudinally-extending axis AX and extends longitudinally between opposing first and second ends 206 and 208. It will be appreciated that compression spring assembly 200 is, in general, substantially similar to compression spring assembly 100, which has been described in detail above, particularly with respect to the overall construction and performance characteristics thereof. As such, it is to be understood that the details set forth above with regard to compression spring assembly 100 are equally applicable to compression spring assembly 200 and are not repeated here.

Compression spring core 202 includes a core body 210 that extends between a first or upper end 212 and a second or lower end 214. Core body 210 also includes a first or upper end wall 216 disposed along first end 212 and a second or lower end wall 218 disposed along second end 214. Core body 210 also includes an inner core wall 220 that at least partially defines a core inner passage 222.

Compression spring core 202 differs from compression spring core 102 in that core body 210 of compression spring core 202 includes an outer core wall 224 and an annular shoulder wall 226 that projects radially-outwardly beyond the outer core wall to form an outer peripheral extent of the core body. Annular shoulder wall 226 can include a shoulder surface 228 that is disposed generally transverse (e.g., approximately perpendicular) to longitudinal axis AX. Additionally, it will be appreciated that annular shoulder wall 226 can be disposed longitudinally along core body 210 in any suitable position or orientation. In the embodiment shown in FIGS. 5-7, annular shoulder wall 226 is disposed toward second end 214 and adjacent second end wall 218. As such, outer core wall 224 has a second height H2' that can be defined between first end wall 212 and shoulder surface 228, such as is shown in FIG. 7, for example.

Compression spring shell 204 includes a shell body 230 that extends longitudinally between a first or upper end 232 and a second or lower end 234. Shell body 230 includes a first or upper shell end wall 236 disposed along first end 232 and a second or lower shell end wall 238 disposed along second end 234. As such, shell body 230 has a first or overall height H3' that is generally defined between the first and second shell end walls.

In the exemplary embodiment shown in FIGS. 5-7, compression spring shell 204 differs from compression spring shell 104 only in that overall height H3' is, in a preferred embodiment, approximately equal in longitudinal length to second height H2' of outer core wall 224. In this manner, first end wall 236 of shell body 230 can be disposed in approximate alignment with at least a portion of first end wall 216 of core body 210, and second end wall 238 can be disposed adjacent or in abutting engagement with shoulder surface 228 of annular shoulder wall 226. It will be appreciated that compression spring shell 204 can be retained in position on or along compression spring core in any suitable manner, such as has been described above in connection with compression spring assembly 100, for example.

Additionally, it will be appreciated that the compression spring shell 204 can be installed along or otherwise assembled together with compression spring core 202, as is indicated by arrows ASM in FIG. 7, in any suitable manner, such as has been described above with regard to compression spring assembly 100, for example.

Figure 8:
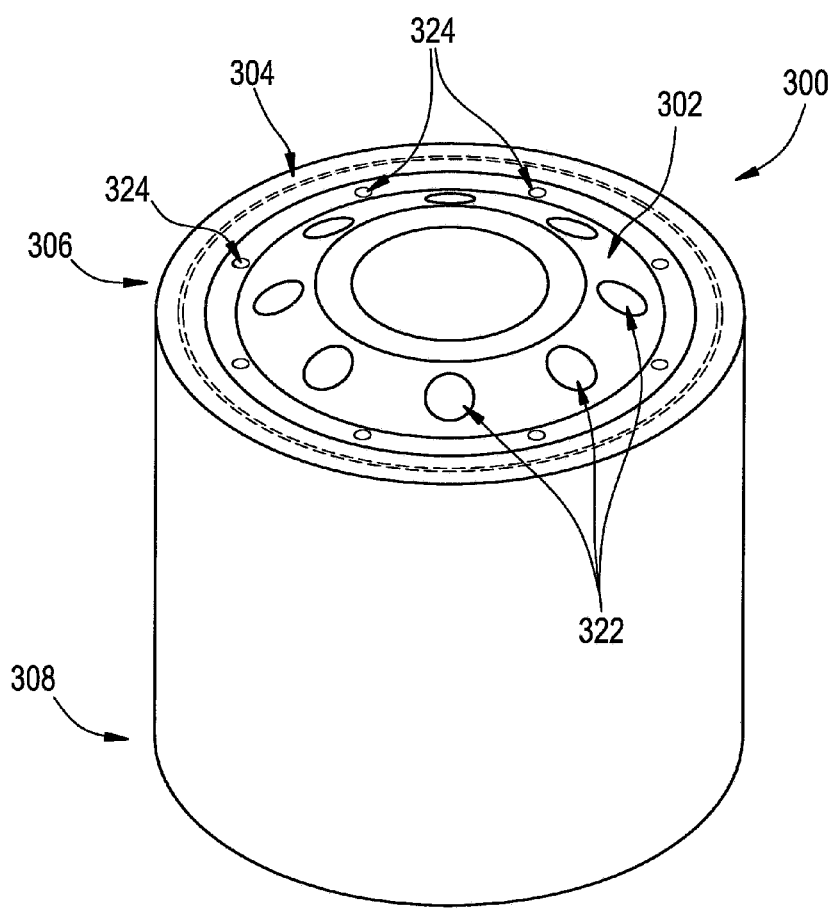
FIG. 8 is a top perspective view of still another example of an elastomeric compression spring assembly in accordance with the subject matter of the present disclosure.
Figure 9:
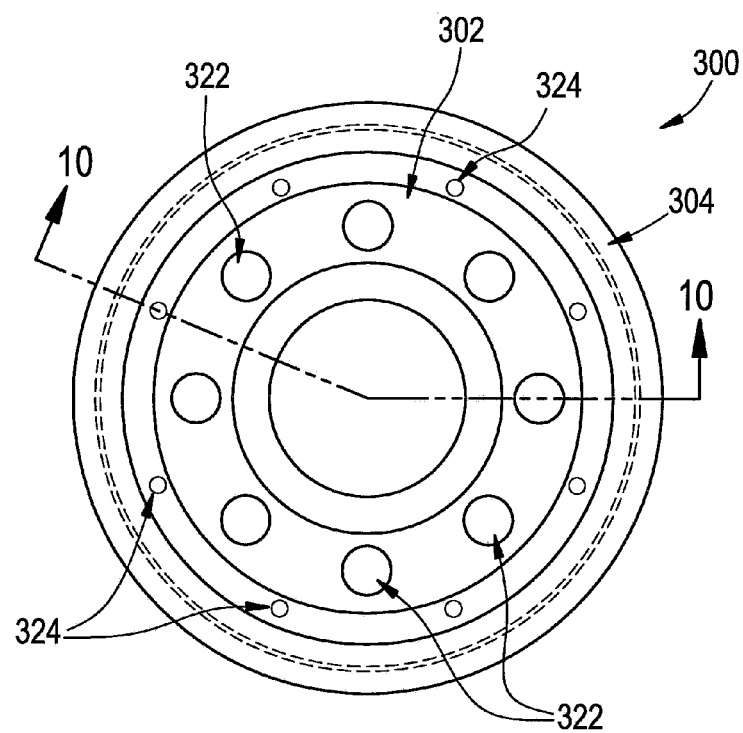
FIG. 9 is a top plan view of the elastomeric compression spring assembly shown in FIG. 8.
Figure 10:
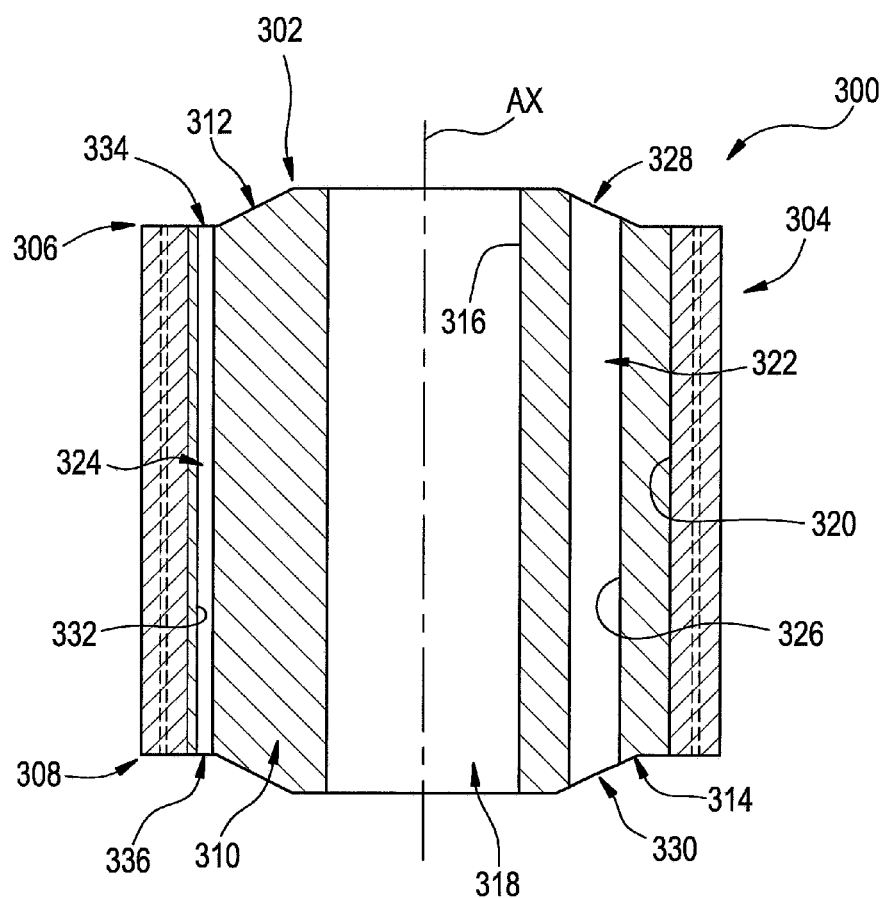
FIG. 10 is a cross-sectional side view of the elastomeric compression spring assembly shown in FIGS. 8 and 9 taken from along line 10-10 in FIG. 9.

Yet another example of a compression spring assembly 300 in accordance with the subject matter of the present disclosure is illustrated in FIG. 8-10. Compression spring assembly 300 includes a compression spring core 302 and a compression spring shell 304, which is provided separately from the compression spring core. Compression spring assembly 300 has a longitudinally-extending axis AX and extends longitudinally between opposing first and second ends 306 and 308. It will be appreciated that compression spring assembly 300 is, in general, substantially similar to compression spring assembly 100, which has been described in detail above, particularly with respect to the overall construction and performance characteristics thereof. As such, it is to be understood that the details set forth above with regard to compression spring assembly 100 are equally applicable to compression spring assembly 300 and are not repeated here.

Compression spring core 302 includes a core body 310 that extends between a first or upper end (not numbered) and a second or lower end (not numbered). Core body 310 also includes a first or upper end wall 312 disposed along the first end of the core body and a second or lower end wall 314 disposed along the second end of the core body. Core body 310 also includes an inner core wall 316 that at least partially defines a core inner passage 318 and an outer core wall 320 that can at least partially define an outer surface (not numbered) of the core body, which can operatively interface with one or more corresponding surfaces of the compression spring shell or components thereof.

Compression spring core 302 differs from compression spring core 102 in that core body 310 of compression spring core 302 includes one or more core-displacement voids that are not shown or described as being present in core body 110. In the exemplary arrangement shown in FIGS. 8-10, core body 310 includes a first plurality of core-displacement voids 322 and a second plurality of core-displacement voids 324. Voids 322 are formed by a void side wall 326 that extends longitudinally through core body 310 such that open ends 328 and 330 of voids 322 are respectively formed along first and second end walls 312 and 314. Voids 322 are spaced radially-outwardly from core inner passage 318 and are disposed circumferentially-spaced relation with respect to one another about axis AX. Similarly, voids 324 are formed by a void side wall 332 that extends longitudinally through core body 310 such that open ends 334 and 336 are respectively formed along the first and second end walls of the core body. Voids 324 are space radially-outwardly from core inner passage 318 and voids 322, and are disposed in circumferentially-space relation with respect to one another about axis AX. Though shown as being at least approximately evenly spaced from one another, it will be appreciated that any other arrangement of voids 322 and/or 324 could alternately be used.

It will be appreciated that the one or more core-displacement voids can be of any suitable size, shape, arrangement and/or configuration, and can be formed partially into or extend fully through core body 310. For example, void side walls 326 and 332 are shown as having an at least approximately circular cross-sectional shape, which results in voids 322 and 324 having an at least approximately cylindrical shape. It will be appreciated, however, that any other shape or configuration could alternately be used, such as a non-circular cross-sectional shape (e.g., oval, polygonal, irregular) or non-cylindrical voids (e.g., frustoconical).

Figure 11:
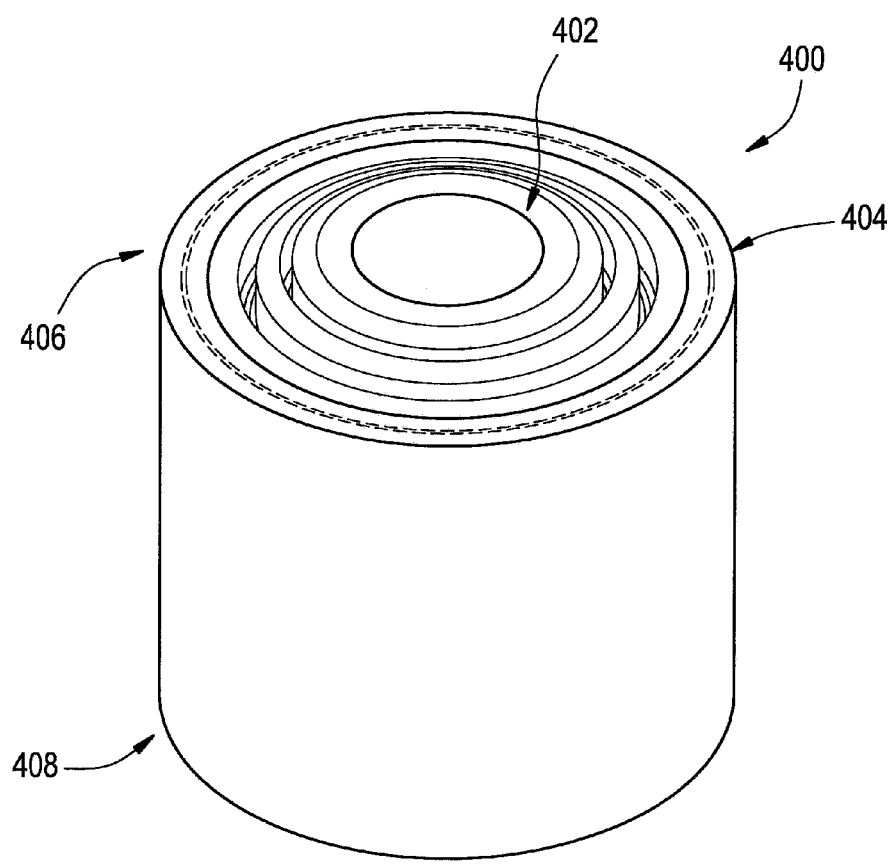
FIG. 11 is a top perspective view of yet another example of an elastomeric compression spring assembly in accordance with the subject matter of the present disclosure.
Figure 12:
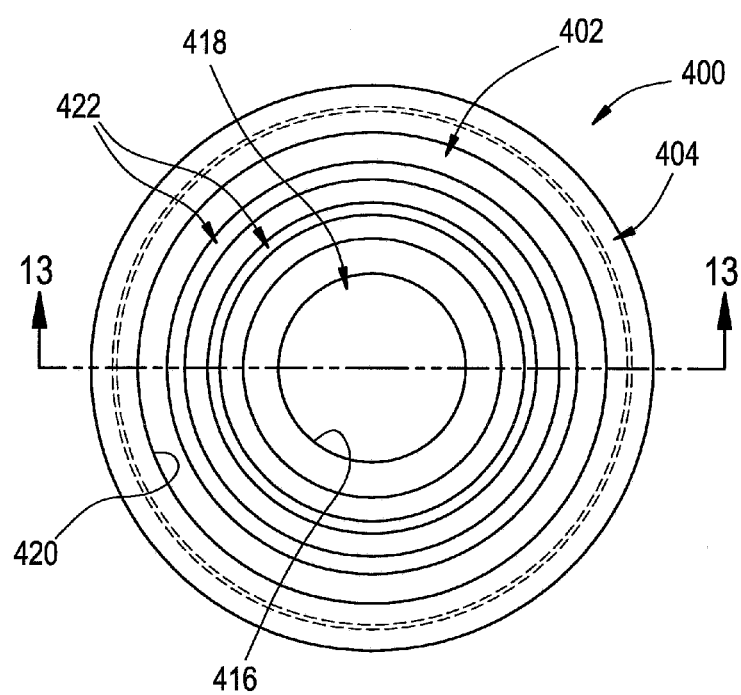
FIG. 12 is a top plan view of the elastomeric compression spring assembly shown in FIG. 11.
Figure 13:
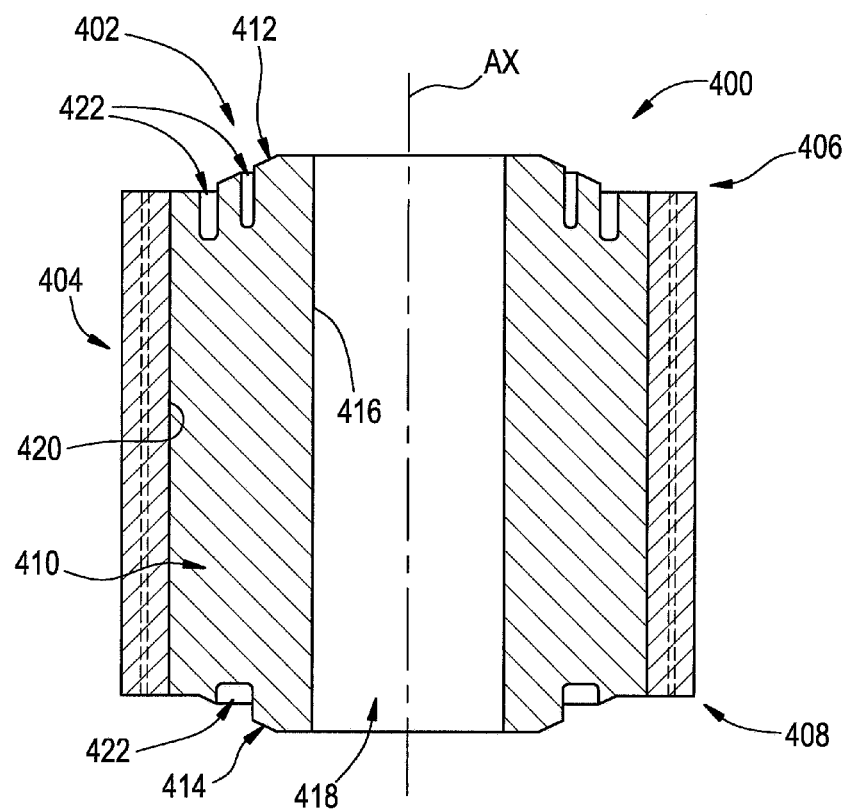
FIG. 13 is a cross-sectional side view of the elastomeric compression spring assembly shown in FIGS. 11 and 12 taken from along line 13-13 in FIG. 12.
Figure 14:
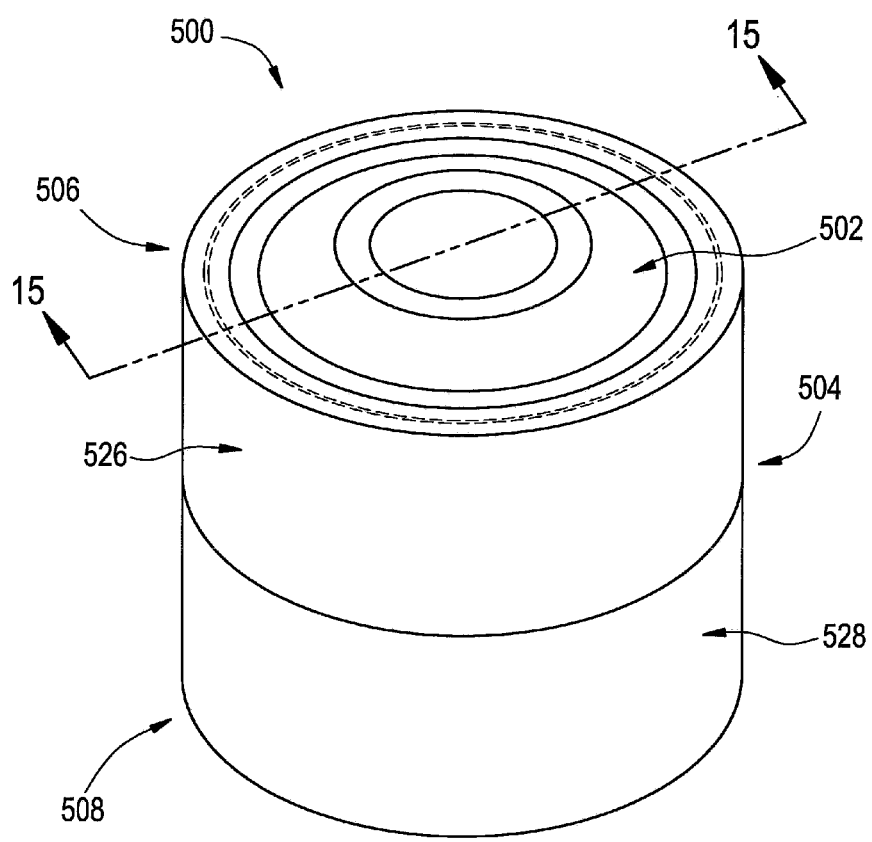
FIG. 14 is a top perspective view of a further example of an elastomeric compression spring assembly in accordance with the subject matter of the present disclosure.
Figure 15:
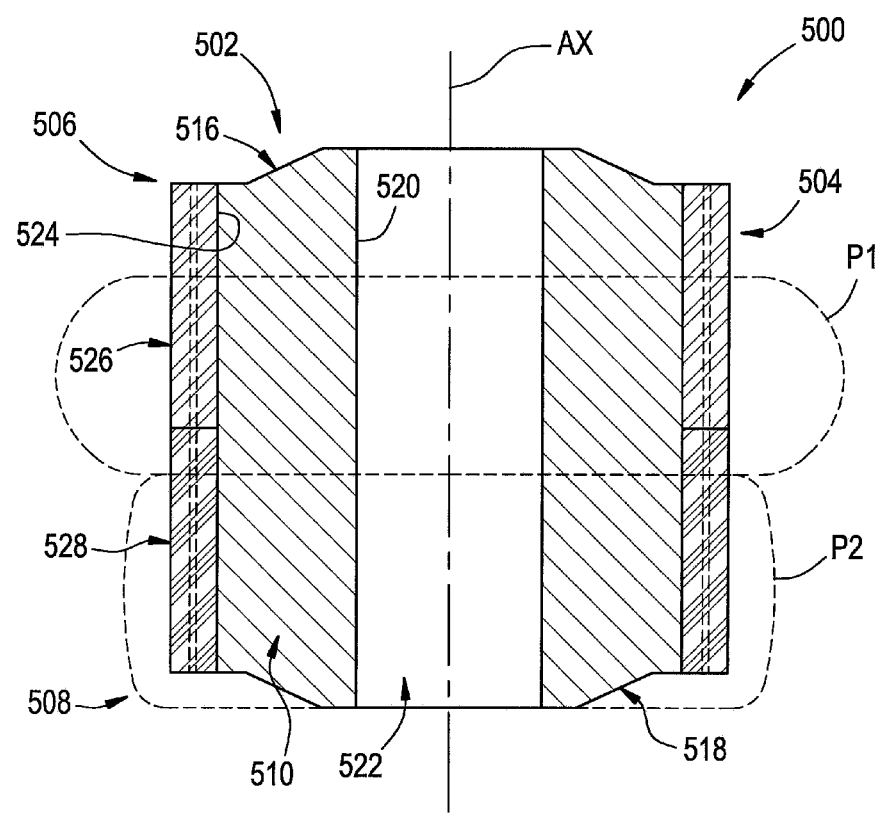
FIG. 15 is a cross-sectional side view of the elastomeric compression spring assembly shown in FIG. 14 taken from along line 15-15 thereof.

Still another example of a compression spring assembly 400 in accordance with the subject matter of the present disclosure is illustrated in FIG. 11-13. Compression spring assembly 400 includes a compression spring core 402 and a compression spring shell 404, which is provided separately from the compression spring core. Compression spring assembly 400 has a longitudinally-extending axis AX and extends longitudinally between opposing first and second ends 406 and 408. It will be appreciated that compression spring assembly 400 is, in general, substantially similar to compression spring assembly 100, which has been described in detail above, particularly with respect to the overall construction and performance characteristics thereof. As such, it is to be understood that the details set forth above with regard to compression spring assembly 100 are equally applicable to compression spring assembly 400 and are not repeated here.

Compression spring core 402 includes a core body 410 that extends between a first or upper end (not numbered) and a second or lower end (not numbered). Core body 410 also includes a first or upper end wall 412 disposed along the first end of the core body and a second or lower end wall 414 disposed along the second end of the core body. Core body 410 also includes an inner core wall 416 that at least partially defines a core inner passage 418 and an outer core wall 420 that can at least partially define an outer surface (not numbered) of the core body, which can operatively interface with one or more corresponding surfaces of the compression spring shell or components thereof.

Compression spring core 402 differs from compression spring core 102 in that core body 410 of compression spring core 402 includes one or more core-displacement voids that are not shown or described as being present in core body 110. In the exemplary arrangement shown in FIGS. 11-13, core body 410 includes a plurality of core-displacement voids 422 formed thereinto. It will be appreciated that the one or more core-displacement voids can be of any suitable size, shape, arrangement and/or configuration. In the exemplary embodiment shown in FIGS. 11-13, voids 422 take the form of endless annular rings that are disposed circumferentially about axis AX with two voids extending longitudinally into the core body from along first end wall 412 and one void extending longitudinally into the core body from along second end wall 414.

It will be appreciated that a compression spring assembly in accordance with the subject matter of the present disclosure can optionally include any suitable number of one or more core-displacement voids, such as voids 322, 324 and/or 422, for example, in any combination, configuration and/or arrangement. If included, any such one or more core-displacement voids can be utilized to permit the spring rate of the compression spring assembly to be varied, in at least a small amount, without varying the overall physical dimensions (e.g., size and shape) of the compression spring assembly. Such arrangements could be particularly advantageous where variations in spring rate are desired but specific physical dimensions of the compression spring assembly are to be maintained, such as for compatibility with other components of an associated system or device, for example.

In general, such one or more core-displacement voids permit material of the core body to flow into and substantially fill the void areas under initial loading conditions of a compression spring assembly. In this manner, at least some amount of radially-outward displacement of the core body may be initially avoided. As a result, the contribution from the compression spring shell to the stiffness of the compression spring assembly may be at least slightly delayed under initial loading conditions. Accordingly, such an arrangement can permit the spring rate of the compression spring assembly to be varied as a function of axial deflection without varying the overall physical dimensions of the compression spring assembly.

A further example of a compression spring assembly 500 in accordance with the subject matter of the present disclosure is illustrated in FIGS. 14-17. Compression spring assembly 500 includes a compression spring core 502 and a compression spring shell 504, which is provided separately from the compression spring core. Compression spring assembly 500 has a longitudinally-extending axis AX and extends longitudinally between opposing first and second ends 506 and 508. It will be appreciated that compression spring assembly 500 includes components that are substantially similar to those described above in connection with compression spring assembly 100. As such, it is to be understood that the details set forth above with regard to compression spring assembly 100 are equally applicable to compression spring assembly 500 and may not be repeated here.

Compression spring core 502 includes a core body 510 that extends between a first or upper end 512 and a second or lower end 514. Core body 510 also includes a first or upper end wall 516 disposed along first end 512 and a second or lower end wall 518 disposed along second end 514. Core body 510 also includes an inner core wall 520 that at least partially defines a core inner passage 522 and an outer core wall 524 that can at least partially define an outer surface (not numbered) of the core body, which can operatively interface with one or more corresponding surfaces of the compression spring shell or components thereof.

Figure 16:
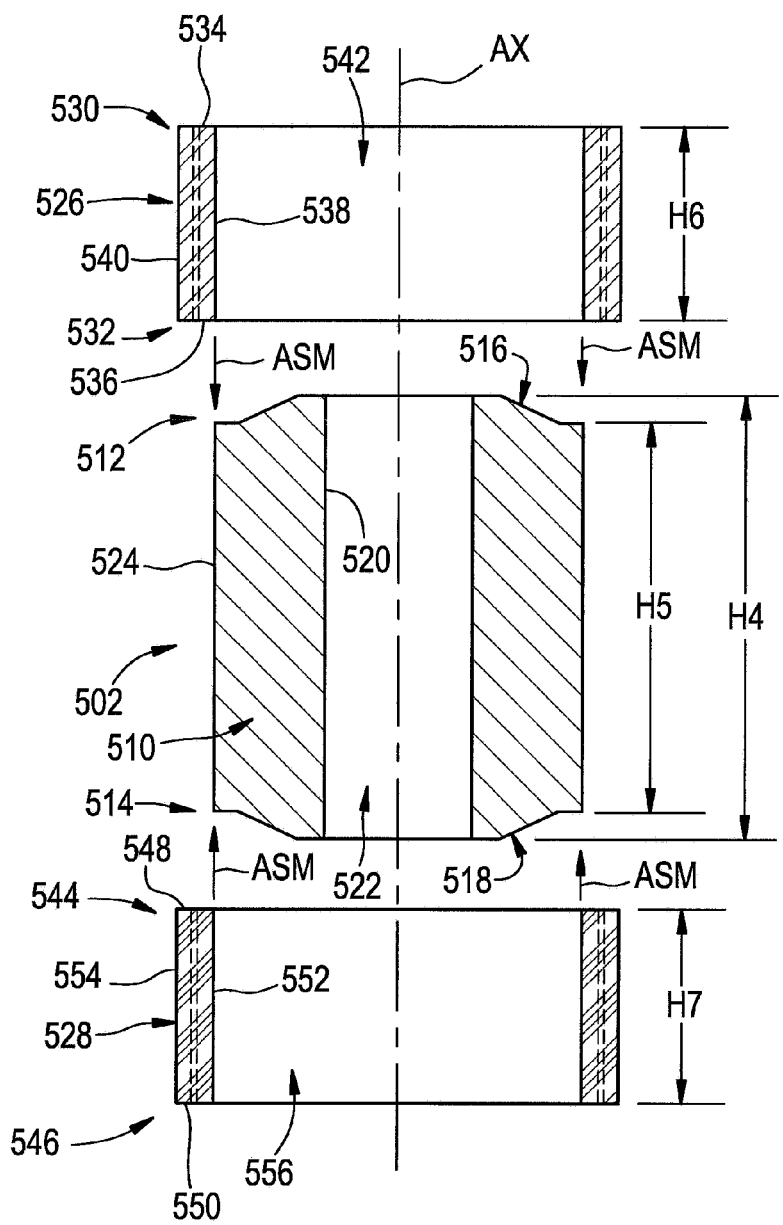
FIG. 16 is an exploded cross-sectional side view of the elastomeric compression spring assembly shown in FIGS. 14 and 15 prior to assembly.

Additionally, core body 510 has a first or overall height, which is represented by reference dimension H4 in FIG. 16, that is generally defined between the opposing first and second end walls (e.g., first end wall 516 and second end wall 518) of the core body. Due to the offset or axial spaced relation of portions of the end walls, outer core wall 524 is has a second height, which is represented by reference dimension H5 in FIG. 16, that is less than overall height H4 of the core body.

As indicated above, a compression spring shell can include any number of one or more shell bodies. Compression spring shell 504 differs from compression spring shell 104 in that compression spring shell includes a plurality of shell bodies that are installed along or otherwise assembled together with compression spring core 502 to form a compression spring assembly 500. As shown in FIGS. 14-17, compression spring shell 504 include a first shell body 526 and a second shell body 528 that are both installed along or otherwise assembled together with core body 510 to form the compression spring assembly.

In general, it will be appreciated that first shell body 526 and second shell body 528 can be substantially similar to shell body 138, such has been described in detail above. And, it will be appreciated that such details may be equally applicable to first and second shell bodies 526 and 528, though not repeated here.

First shell body 526 extends longitudinally between a first or upper end 530 and a second or lower end 532. First shell body 526 includes a first or upper shell end wall 534 disposed along first end 530 and a second or lower shell end wall 536 disposed along second end 532. As such, first shell body 526 has a first or overall height, which is represented in by reference dimension H6 in FIG. 16, that is generally defined between first and second shell end walls 534 and 536. First shell body 526 also includes a first inner shell wall 538 and an opposing first outer shell wall 540. First inner shell wall 538 at least partially defines a first shell inner passage 542 that extends through the first shell body.

Second shell body 528 extends longitudinally between a first or upper end 544 and a second or lower end 546. Second shell body 528 includes a first or upper shell end wall 548 disposed along first end 544 and a second or lower shell end wall 550 disposed along second end 546. As such, second shell body 528 has a second or overall height, which is represented in by reference dimension H7 in FIG. 16, that is generally defined between first and second shell end walls 548 and 550. Second shell body 528 also includes a second inner shell wall 552 and an opposing second outer shell wall 554. Second inner shell wall 552 at least partially defines a second shell inner passage 556 that extends through the second shell body.

In the arrangement shown in FIGS. 14-17, the total height or longitudinal length of first and second shell bodies 526 and 528 (i.e., height H6 plus height H7) is approximately equal to second height H5 of outer core wall 524. It will be appreciated, however, that other arrangements could be used. For example, core body 510 could optionally include an annular shoulder wall, such as is shown and described above as annular shoulder wall 226, for example, that is disposed along the outer core wall. In such case, the total height of the first and second shell bodies may be less than the second height of the core body due to the inclusion of such an annular shoulder wall. Additionally, it may be recognized that heights H6 and H7 of the first and second shell bodies, respectively, appear to be approximately equal to one another. It will be appreciated, however, that an arrangement in which one of heights H6 and H7 is greater than the other can alternately be used.

In cases in which a compression spring shell includes two or more shell bodies, it will be appreciated that such two or more shell bodies can be substantially identical to one another or one or more of the shell bodies can be different from the others, in any combination and without limitation. The use of two or more shell bodies that are all substantially similar to one another may result in improved manufacturing efficiencies and/or other benefits, such as may result from decreased curing times due to reduced material masses, for example.

In other cases, however, two or more shell bodies may be used that are different from one another, such as in size, shape and/or construction. In such cases, the two or more shell bodies may provide different performance characteristics. As a result, such configurations are expected to be capable of providing a variable spring rate as well as permitting the load deflection curve of such compression spring assemblies to be designed to provided desired performance characteristics in a manner that is not currently available in known compression spring constructions.

For example, first shell body 526 and second shell body 528 can be formed from one or more layers of material that provide different performance characteristics, such as by restricting or otherwise restraining at least the radially-outward expansion of different portions of the compression spring core in different amounts or to different degrees. In this manner, a first portion, such as is identified by reference characters P1 in FIG. 15, of compression spring assembly 500 can have a lower or softer spring rate than a second or other portion, such as is identified by reference characters P2 in FIG. 15. As a result, first portion P1 may be permitted to expand radially-outwardly a greater amount than second portion P2, as is illustrated as an example in FIG. 15.

Figure 17:
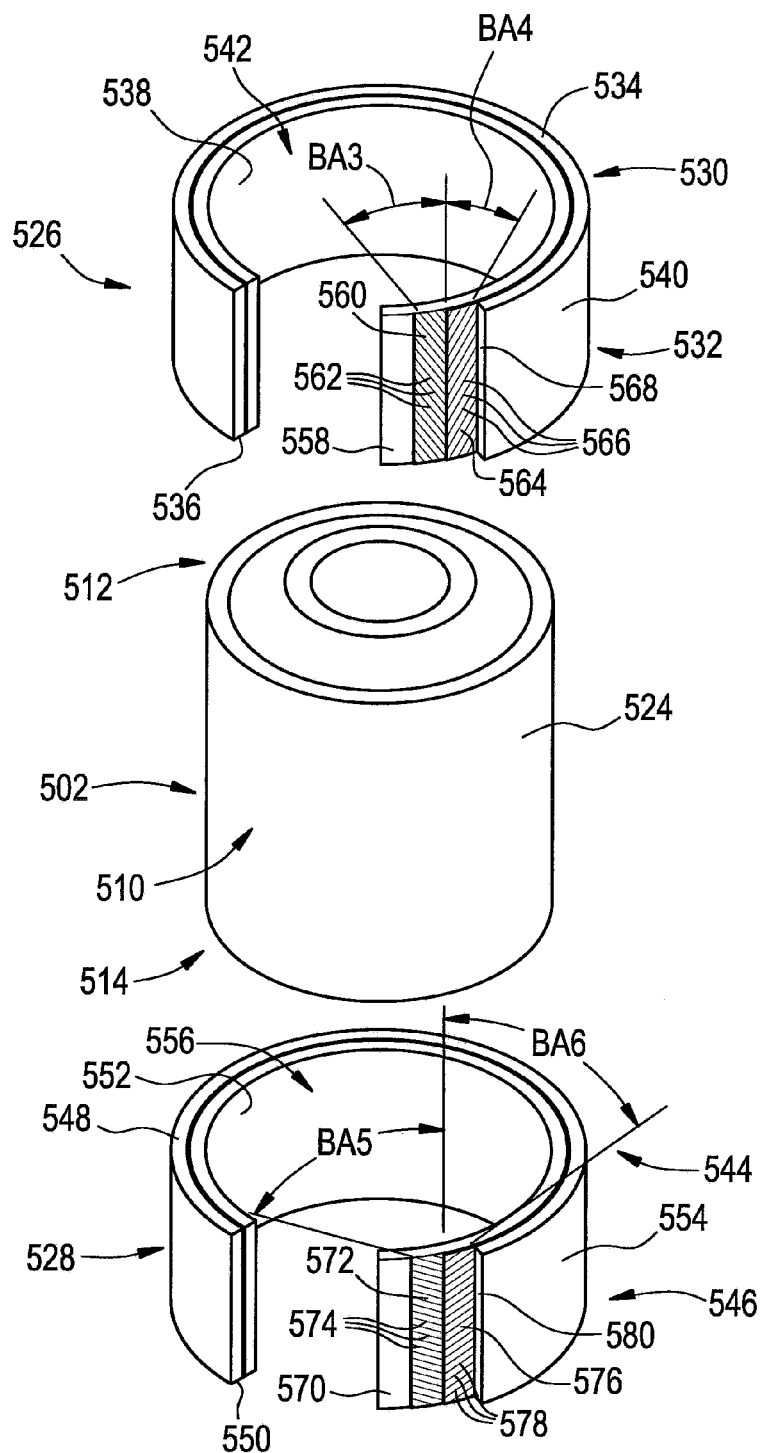
FIG. 17 is an exploded, top perspective view, in partial cross-section, of the elastomeric compression spring assembly in FIGS. 14-16 prior to assembly.

One example of a manner in which the two or more shell bodies can provide different performance characteristics is illustrated in FIG. 17 in which first shell body 526 and second shell body 528 are both shown in additional detail. First shell body 526 can include a first or inner layer or ply 558 that at least partially defines first inner shell wall 538. A first reinforcing layer or ply 560 can be disposed radially-outwardly of the first inner layer and can include a first plurality of reinforcing cords 562 that are at least partially embedded therein. A second reinforcing layer or ply 564 can be disposed radially-outwardly of the first reinforcing ply and include a second plurality of reinforcing cords 566 that are at least partially embedded therein. A second or outer layer or ply 568 can be disposed radially-outwardly of the second reinforcing ply and can at least partially define first outer shell wall 540.

Similarly, second shell body 528 can include a first or inner layer or ply 570 that at least partially defines second inner shell wall 552. A first reinforcing layer or ply 572 can be disposed radially-outwardly of the first inner layer and can include a first plurality of reinforcing cords 574 that are at least partially embedded therein. A second reinforcing layer or ply 576 can be disposed radially-outwardly of the first reinforcing ply and include a second plurality of reinforcing cords 578 that are at least partially embedded therein. A second or outer layer or ply 580 can be disposed radially-outwardly of the second reinforcing ply and can at least partially define second outer shell wall 554.

Layers 558, 560, 564 and 568 as well as layers 570, 572, 576 and 580 can be formed in a manner substantially similar to that described in detail above in connection with layers 154, 156, 160 and 164. Additionally, reinforcing cords 562 and 566 as well as 574 and 578 can be substantially similar to those described in detail above in connection with reinforcing cords 158 and 162. As such, a detailed discussion regarding the structure, materials and overall construction of these components and elements is not repeated here.

One manner in which the different performance characteristics of first and second shell bodies 526 and 528 can be provided is through the use of reinforcing cords in the first shell body that are disposed at one or more different bias angles than the one or more bias angles of the reinforcing cords in the second shell body. Such an arrangement is shown in FIG. 17 in which reinforcing cords 562 and 566 of first and second reinforcing plies 560 and 564 are respectively disposed at first and second bias angles, which are identified by reference dimensions BA3 and BA4. Reinforcing cords 574 and 578 of first and second reinforcing plies 572 and 576 are respectively disposed at third and fourth bias angles, which are identified by reference dimensions BA5 and BA6 in FIG. 17. It will be appreciated that any suitable bias angle of can be used for bias angles BA3-BA6, such as a bias angle within a range of from approximately 3 degrees to approximately 87 degrees, for example. In a preferred arrangement, however, first and second bias angles BA3 and BA4 are preferably different than third and fourth bias angles BA5 and BA6. For example, such as is shown in FIG. 17, first and second bias angles BA3 and BA4 can be at least approximately equal to one another but are oriented in opposing directions, and third and fourth bias angles BA5 and BA6 can be at least approximately equal to one another but oriented in opposing directions. In such case, however, first and second bias angles BA3 and BA4 are different than third and fourth bias angles BA5 and BA6.

Figure 18:
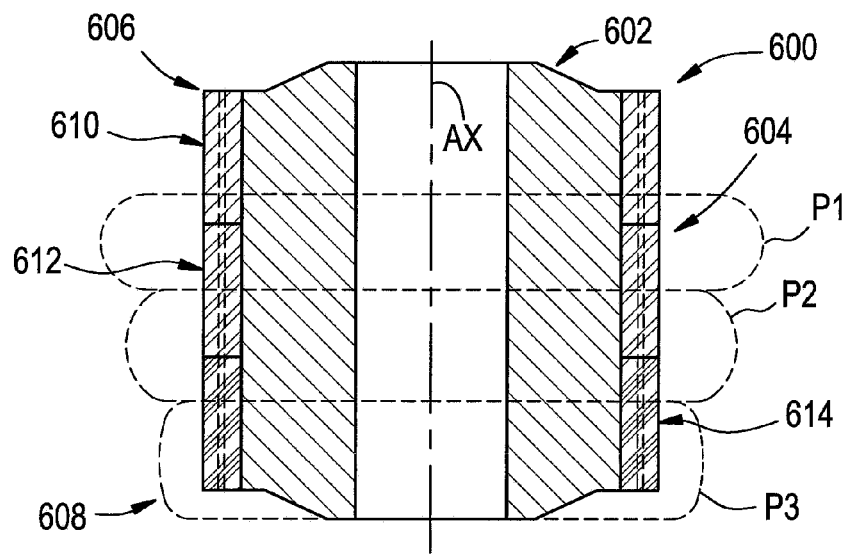
FIG. 18 is a cross-sectional side view of still a further example of an elastomeric compression spring assembly in accordance with the subject matter of the present disclosure.

Yet a further example of a compression spring assembly 600 in accordance with the subject matter of the present disclosure is illustrated in FIG. 18. Compression spring assembly 600 includes a compression spring core 602 and a compression spring shell 604, which is provided separately from the compression spring core. Compression spring assembly 600 has a longitudinally-extending axis AX and extends longitudinally between opposing first and second ends 606 and 608. It will be appreciated that compression spring assembly 600 includes components that are substantially similar to those described above in connection with compression spring assembly 500. As such, it is to be understood that the details set forth above with regard to compression spring assembly 500 are equally applicable to compression spring assembly 600 and may not be repeated here.

Compression spring 600 differs from compression spring 500 in that compression spring shell 604 includes first, second and third shell bodies 610, 612 and 614 that each provide different performance characteristics, such as by restricting or otherwise restraining at least the radially-outward expansion of different portions of the compression spring core in different amounts or to different degrees. In this manner, a first portion, such as is identified by reference characters P1 in FIG. 18, of compression spring assembly 600 can have a first spring rate. Compression spring assembly 600 can also include a second portion, such as is identified by reference characters P2 in FIG. 18, that has a second spring rate, which is different from the first spring rate. The compression spring assembly can further include a third portion, such as is identified by reference characters P3 in FIG. 18, that has a third spring rate that is different from each of the first and second spring rates. Such an arrangement can be attained through the use of different bias angles for the reinforcing cords in each of the three different shell bodies, such as has been discussed above in connection with compression spring assembly 500, for example.

Figure 19:
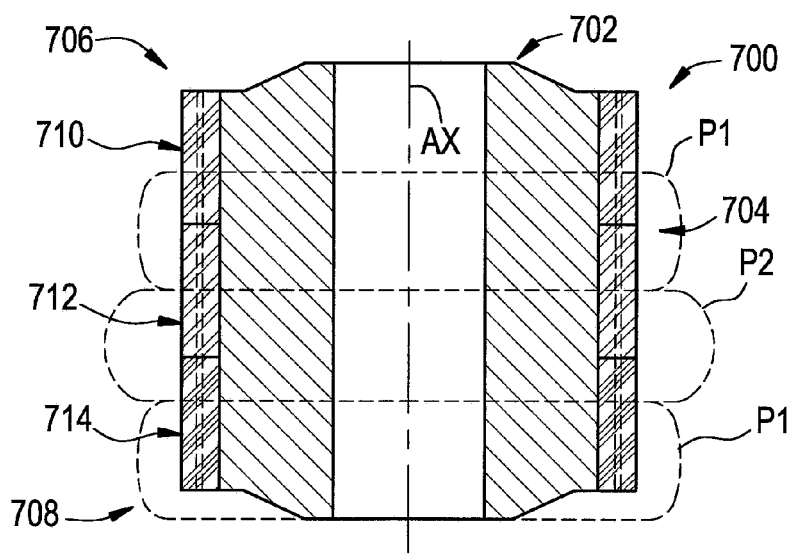
FIG. 19 is a cross-sectional side view of yet a further example of an elastomeric compression spring assembly in accordance with the subject matter of the present disclosure.
Figure 20:
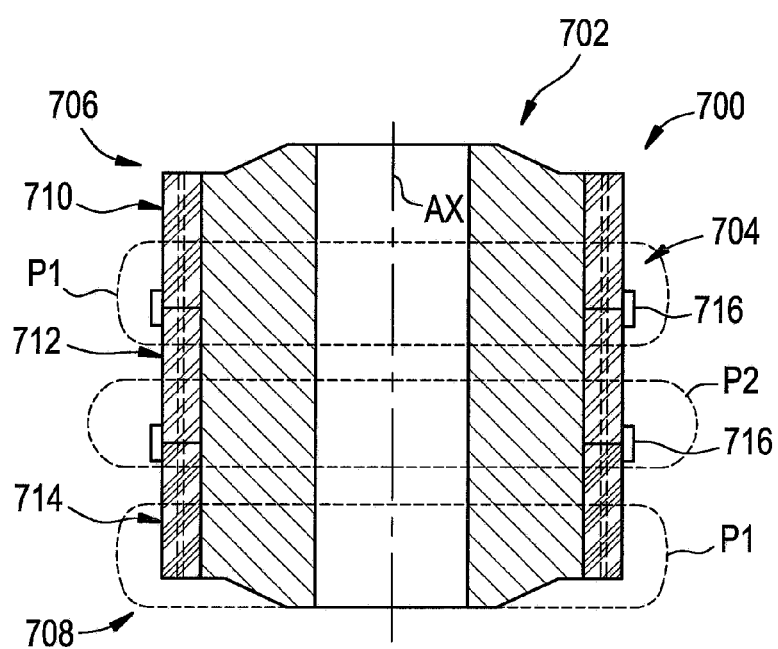
FIG. 20 is a cross-sectional side view of another example of an elastomeric compression spring assembly in accordance with the subject matter of the present disclosure.

Still a further example of a compression spring assembly 700 in accordance with the subject matter of the present disclosure is illustrated in FIGS. 19 and 20. Compression spring assembly 700 includes a compression spring core 702 and a compression spring shell 704, which is provided separately from the compression spring core. Compression spring assembly 700 has a longitudinally-extending axis AX and extends longitudinally between opposing first and second ends 706 and 708. It will be appreciated that compression spring assembly 700 includes components that are substantially similar to those described above in connection with compression spring assembly 500. As such, it is to be understood that the details set forth above with regard to compression spring assembly 500 are equally applicable to compression spring assembly 700 and may not be repeated here.

Compression spring 700 differs from compression spring 500 in that compression spring shell 704 includes first, second and third shell bodies 710, 712 and 714 that provide at least two different performance characteristics, such as by restricting or otherwise restraining at least the radially-outward expansion of different portions of the compression spring core in different amounts or to different degrees. In this manner, first portions, such as are identified by reference characters P1 in FIGS. 19 and 20, of compression spring assembly 700 can have a first spring rate. Compression spring assembly 700 can also include a second portion, such as is identified by reference characters P2 in FIGS. 19 and 20, that has a second spring rate, which is different from the first spring rate. In the exemplary arrangement shown, second portion P2 is disposed between first portions P1. It will be appreciated, however, that any other arrangement could alternately be used. Such an arrangement can be attained through the use of approximately the same bias angles for the reinforcing cords in the shell bodies that function as the first portions (e.g., shell bodies 706 and 710) and a different bias angle for the reinforcing cords in the second shell body that functions as the second portion (e.g., shell body 708), such as in the manner discussed above in connection with compression spring assembly 500, for example.

Compression spring shells, such as those described in connection with assemblies 500, 600 and/or 700, for example, can be installed along or otherwise assembled together with corresponding compression spring core thereof in any manner suitable for forming, such as has been described above and as is represented in FIG. 16 by arrows ASM. Additionally, the one or more shell bodies of the compression spring shell can be retained in position on or along the compression spring core in any suitable manner. In many cases, the frictional interengagement between the abutting inner shell wall or walls and the outer core wall may be sufficient to retain the compression spring shell in position on or along the compression spring core. Additionally, or in the alternative, a retaining element may be used to attach the otherwise separate components of the compression spring assembly to one another. For example, an adhesive substance (not shown) could be disposed between abutting surfaces of the compression spring shell and the compression spring core. As another example, a non-elastic retaining element, such as a metal retaining ring 716 (FIG. 20), for example, could be crimped or otherwise secured along the compression spring shell to affix the same in position on the compression spring core. It will be appreciated, however, that any other suitable arrangement could alternately be used.

Figure 21:
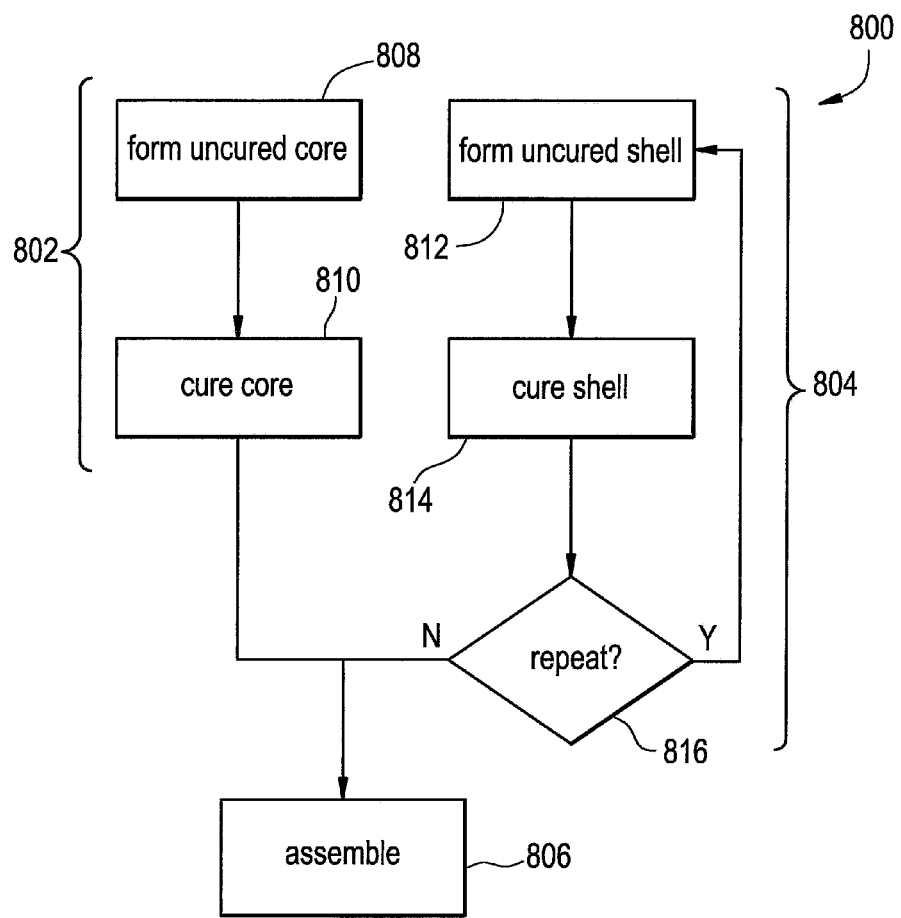
FIG. 21 is a graphical representation of one example of a method of manufacturing an elastomeric compression spring assembly in accordance with the subject matter of the present disclosure.

One example of a method 800 of manufacturing a compression spring assembly in accordance with the subject matter of the present disclosure is graphically represented in FIG. 21 and includes providing a compression spring core, such as any one of compression spring cores 102, 202, 302, 402, 502, 602 and/or 702, for example, as is represented in FIG. 21 by item number 802. Method 800 also includes providing a compression spring shell, such as any one of compression spring shells 104, 204, 304, 404, 504, 604 and/or 704, for example, as is represented in FIG. 21 by item number 804. Method 800 also includes assembling the compression spring core and the compression spring shell together to form a compression spring assembly, such as any one of compression spring assemblies 100, 200, 300, 400, 500, 600 and/or 700, for example, as is represented in FIG. 21 by item number 806.

It will be appreciated that the action of providing a compression spring core in 802 can be performed in any suitable manner. As one example, action 802 can include forming an uncured core body from a mass of elastomeric material, as is represented by item number 808, and curing the core body in a suitable manner, as is represented by item number 810. Additionally, it will be appreciated that the action of providing a compression spring shell in 804 can be performed in any suitable manner. As one example, action 804 can include forming a shell body that includes one or more layers of uncured elastomeric material, as is represented by item number 812, and curing the shell body in a suitable manner separately from the core body, as is represented by item number 814. Actions 812 and 814 can be repeated any suitable number of times for compression spring assemblies that include two or more shell bodies, as is represented by item number 816.

As used herein with reference to certain elements, components and/or structures, numerical ordinals (e.g., "first end" and "second end") merely denote different singles of a plurality and do not imply any order or sequence unless specifically defined by the claim language. Additionally, it will be recognized that numerous different features and/or components are presented in the embodiments shown and described herein, and that no one embodiment may be included that specifically shows and describes or otherwise includes all such features and components. It is to be understood, however, that the subject matter of the present disclosure is intended to encompass any and all combinations of the different features and components that are shown and described herein, and that, without limitation, any suitable arrangement of features and components, in any combination, can be used. Thus it is to be distinctly understood claims directed to any such combination of features and/or components, whether or not specifically embodied herein, are intended to find support in the present disclosure.

While the subject novel concept has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles of the subject novel concept. Obviously, modifications and alterations will occur to others upon reading and understanding the preceding detailed description. Accordingly, it is to be distinctly understood that the foregoing descriptive matter is to be interpreted merely as illustrative of the present novel concept and not as a limitation. As such, it is intended that the subject novel concept be construed as including all such modifications and alterations insofar as they come within the scope of the appended claims and any equivalents thereof.

The invention claimed is:

1. A compression spring assembly comprising:
   a compression spring core including a core body formed from one of cured rubber material and thermoplastic elastomer material, said core body extending longitudinally between opposing first and second core ends and having a longitudinal axis, said core body including a first core end surface, a second core end surface disposed in longitudinally-spaced relation to said first core end surface and an outer core surface; and,
   a compression spring shell including:

a first shell body including at least one layer formed from one of cured rubber material and thermoplastic elastomer material, said first shell body extending longitudinally between opposing first shell ends, said first shell body including a first shell end surface, a second shell end surface disposed in longitudinally-spaced relation to said first shell end surface, a first inner shell surface and a first outer shell surface, said first inner shell surface at least partially defining a first shell inner passage extending at least approximately longitudinally through said first shell body; and, a second shell body including at least one layer formed from one of cured rubber material and thermoplastic elastomer material, said second shell body extending longitudinally between opposing second shell ends, said second shell body including a third shell end surface, a fourth shell end surface disposed in longitudinally-spaced relation to said third shell end surface, a second inner shell surface and a second outer shell surface, said second inner shell surface at least partially defining a second shell inner passage extending at least approximately longitudinally through said second shell body;

said compression spring core and said first and second shell bodies each being cured separately from one another prior to assembly in which said first and second shell bodies are telescoped over and supported on said compression spring core such that said first inner shell surface of said first shell body and said second inner shell surface of said second shell body extend along and in abutting engagement with at least a portion of said outer core surface.

2. A compression spring assembly according to claim 1, wherein said compression shell spring includes a third shell body including at least one layer formed from one of cured rubber material and thermoplastic elastomer material, said third shell body extending longitudinally between opposing third shell ends, said third shell body including a fifth shell end surface, a sixth shell end surface disposed in longitudinally-spaced relation to said fifth shell end surface, a third inner shell surface and a third outer shell surface, said third inner shell surface at least partially defining a third shell inner passage extending at least approximately longitudinally through said third shell body, said third shell body being supported on said compression spring core such that said third inner shell surface extends along and is in abutting engagement with at least a portion of said outer core surface.

3. A compression spring assembly according to claim 2, wherein said first shell body includes first and second reinforcing layers, said second shell body includes third and fourth reinforcing layers and said third shell body includes fifth and sixth reinforcing layers, said first and second reinforcing layers include reinforcing cords disposed in opposing directions at a first bias angle relative to said longitudinal axis, said third and fourth reinforcing layers include reinforcing cords disposed in opposing directions at a second bias angle relative to said longitudinal axis, and said fifth and sixth reinforcing layers include reinforcing cords disposed in opposing directions at a third bias angle relative to said longitudinal axis.

4. A compression spring assembly according to claim 3, wherein said first and third shell bodies are disposed in longitudinally-spaced relation to one another along said compression spring core with said second shell body disposed between said first and third shell bodies, and said first and third bias angles are approximately equal to one another such that said first and third shell bodies contribute to approximately equal spring rates along corresponding portions of said compression spring assembly.

5. A compression spring assembly comprising:
a compression spring core including a core body formed from one of cured rubber material and thermoplastic elastomer material, said core body extending longitudinally between opposing first and second core ends and having a longitudinal axis, said core body including a first core end surface, a second core end surface disposed in longitudinally-spaced relation to said first core end surface, an inner core surface and an outer core surface, said inner core surface at least partially defining a core inner passage extending at least approximately longitudinally through said core body; and,
a compression spring shell including:
a first shell body including at least one layer formed from one of cured rubber material and thermoplastic elastomer material with first and second reinforcing layers at least partially embedded therein, said first shell body extending longitudinally between opposing first shell ends, said first shell body including a first shell end surface, a second shell end surface disposed in longitudinally-spaced relation to said first shell end surface, a first inner shell surface and a first outer shell surface, said first inner shell surface at least partially defining a first shell inner passage extending at least approximately longitudinally through said first shell body, said first and second reinforcing layers including reinforcing cords disposed between said first inner shell surface and said first outer shell surface and oriented in opposing directions at a first bias angle relative to said longitudinal axis;
a second shell body including at least one layer formed from one of cured rubber material and thermoplastic elastomer material with third and fourth reinforcing layers at least partially embedded therein, said second shell body extending longitudinally between opposing second shell ends, said second shell body including a third shell end surface, a fourth shell end surface disposed in longitudinally-spaced relation to said third shell end surface, a second inner shell surface and a second outer shell surface, said second inner shell surface at least partially defining a second shell inner passage extending at least approximately longitudinally through said second shell body, said third and fourth reinforcing layers including reinforcing cords disposed between said second inner shell surface and said second outer shell surface and oriented in opposing directions at a second bias angle relative to said longitudinal axis; and,
a third shell body including at least one layer formed from one of cured rubber material and thermoplastic elastomer material with fifth and sixth reinforcing layers at least partially embedded therein, said third shell body extending longitudinally between opposing third shell ends, said third shell body including a fifth shell end surface, a sixth shell end surface disposed in longitudinally-spaced relation to said fifth shell end surface, a third inner shell surface and a third outer shell surface, said third inner shell surface at least partially defining a third shell inner passage extending at least approximately longitudinally through said third shell body, said fifth and sixth reinforcing layers including reinforcing cords disposed between said third inner shell surface and said third outer shell surface and oriented in opposing directions at a third bias angle relative to said longitudinal axis;

said first, second and third shell bodies of said compression spring shell being supported on said compression spring core such that said first inner shell surface of said first shell body, said second inner shell surface of said second shell body and said third inner shell surface of said third shell body extend along and in abutting engagement with at least a portion of said outer core surface with at least one of said first, second and third bias angles being different from one other of said first, second and third bias angles such that said first, second and third shell bodies contribute to two or more different spring rates along corresponding portions of said compression spring assembly.

6. A compression spring assembly comprising:
a compression spring core at least partially formed from one of cured rubber material and thermoplastic elastomer, said compression spring core including a core body extending longitudinally between opposing first and second core ends and having a longitudinal axis, said core body including a first core end surface, a second core end surface disposed in longitudinally-spaced relation to said first core end surface; and,
a compression spring shell formed separately from said compression spring core and at least partially from one of cured rubber material and thermoplastic elastomer material, said compression spring shell including a shell body and a plurality of reinforcing layers embedded therein, said compression spring shell extending longitudinally between opposing first and second shell ends, said shell body including a first shell end surface, a second shell end surface disposed in longitudinally-spaced relation to said first shell end surface, an inner shell surface and an outer shell surface, said inner shell surface at least partially defining a shell inner passage extending at least approximately longitudinally through said shell body, said plurality reinforcing layers including reinforcing cords disposed between said inner and outer shell surfaces;
said compression spring shell supported on said compression spring core such that said inner shell surface extends coextensively along and in facing relation with at least a portion of said outer core surface.

7. A compression spring assembly according to claim 6, wherein said compression spring shell is removably supported on said compression spring core with said outer core surface and said inner shell surface frictionally interengaging one another to at least partially retain said compression spring shell on said compression spring core.

8. A compression spring assembly according to claim 6, wherein said compression spring shell is fixedly attached to said compression spring core by an adhesive substance disposed between said outer core surface and said inner shell surface.

9. A compression spring assembly according to claim 6, wherein said core body includes an inner core surface at least partially defining a core inner passage extending at least approximately longitudinally through said core body.

10. A compression spring assembly according to claim 6, wherein compression spring core has a core height defined between said first and second core end surfaces, and said compression spring shell has a shell height defined between said first and second shell end surfaces that is less than said core height of said compression spring core.

11. A compression spring assembly according to claim 6, wherein said compression spring shell includes an inner layer that at least partially defines said inner shell surface.

12. A compression spring assembly according to claim 6, wherein said plurality of reinforcing layers include a first reinforcing layer and a second reinforcing layer, said first reinforcing layer including a first plurality of reinforcing cords disposed at a first bias angle relative to said longitudinal axis, and said second reinforcing layer including a second plurality of reinforcing cords disposed at a second bias angle relative to said longitudinal axis.

13. A compression spring assembly according to claim 12, wherein said first and second pluralities of reinforcing cords are disposed in opposing orientations relative to one another with said first and second bias angles being at least approximately equal to one another in opposing directions.

14. A compression spring assembly according to claim 6, wherein said compression spring shell includes an outer layer that at least partially defines said outer shell surface.

15. A compression spring assembly according to claim 6, wherein said core body includes an annular groove having a bottom wall portion and an open end opposite said bottom wall portion, said annular groove extending into said core body from along one of said first and second core end surfaces such that said open end is formed along said one of said first and second core end surfaces.

16. A compression spring assembly according to claim 6, wherein said core body includes a plurality of core outer passages extending at least partially into said core body in circumferentially spaced relation to one another about said longitudinal axis.

17. A compression spring assembly according to claim 16, wherein at least one of said plurality of core outer passage extends at least approximately longitudinally through said core body.

18. A compression spring assembly according to claim 16, wherein said plurality of core outer passages are approximately evenly spaced from one another about said longitudinal axis.

19. A compression spring assembly according to claim 6, wherein said core body includes an annular shoulder wall projecting radially-outwardly beyond said outer core surface and at least partially defining an outmost peripheral extent of said core body.

20. A compression spring assembly according to claim 19, wherein said first shell end of said compression spring shell is disposed adjacent said annular shoulder wall of said core body.

* * * * *